(12) United States Patent
Hussain et al.

(10) Patent No.: US 7,337,314 B2
(45) Date of Patent: Feb. 26, 2008

(54) APPARATUS AND METHOD FOR ALLOCATING RESOURCES WITHIN A SECURITY PROCESSOR

(75) Inventors: Muhammad Raghib Hussain, Pleasanton, CA (US); Philip H. Dickinson, Cupertino, CA (US); Imran Badr, Fremont, CA (US)

(73) Assignee: Cavium Networks, Inc., Mountain View, CA (US)

( * ) Notice: Subject to any disclaimer, the term of this patent is extended or adjusted under 35 U.S.C. 154(b) by 0 days.

(21) Appl. No.: 10/411,945

(22) Filed: Apr. 12, 2003

(65) Prior Publication Data

US 2004/0202319 A1    Oct. 14, 2004

(51) Int. Cl.
*H04L 9/00* (2006.01)
*H04L 9/32* (2006.01)
*G06F 11/30* (2006.01)
*G06F 12/14* (2006.01)

(52) U.S. Cl. .................. 713/151; 713/152; 713/153; 713/189

(58) Field of Classification Search ................. 713/153
See application file for complete search history.

(56) References Cited

U.S. PATENT DOCUMENTS

| | | | |
|---|---|---|---|
| 4,099,235 A | 7/1978 | Hoschler et al. | |
| 6,157,955 A | 12/2000 | Narad et al. | |
| 6,262,989 B1 | 7/2001 | Gemar | |
| 6,289,369 B1 | 9/2001 | Sundaresan | |
| 6,366,945 B1 | 4/2002 | Fong et al. | |
| 6,442,165 B1 * | 8/2002 | Sitaraman et al. | 370/395.4 |
| 6,477,646 B1 | 11/2002 | Krishna et al. | |
| 6,550,020 B1 | 4/2003 | Floyd et al. | |
| 6,789,147 B1 * | 9/2004 | Kessler et al. | 710/200 |
| 2001/0003831 A1 | 6/2001 | Boland | |
| 2002/0181476 A1 * | 12/2002 | Badamo et al. | 370/401 |
| 2002/0184489 A1 * | 12/2002 | Mraz | 713/153 |

(Continued)

FOREIGN PATENT DOCUMENTS

WO    PCT/US2004/010912    9/2004

OTHER PUBLICATIONS

Cavium Networks Introduces Industry's Highest Performance Network Security Processor Family, Oct. 15, 2001, Retrieved from the Internet on Jun. 28, 2006: <URL; http://www.cavium.com/newsevents_products.html>.*

(Continued)

*Primary Examiner*—Benjamin E. Lanier
(74) *Attorney, Agent, or Firm*—Blakely, Sokoloff, Taylor & Zafman, LLP

(57) ABSTRACT

A security processing apparatus is described comprising: a cryptographic processor having a first plurality of security processing resources initially allocated to process a first type of data traffic and a second plurality of security processing resources initially allocated to process a second type of data traffic; a monitor module to monitor load on the first plurality of security processing resources and the second plurality of security processing resources as the first and second types of data traffic are processed; a resource allocation module to reallocate some of the first plurality of security processing resources from the first type of data traffic to the second type of data traffic if detected load on the second plurality of security processing resources is above a specified threshold value.

15 Claims, 12 Drawing Sheets

U.S. PATENT DOCUMENTS

| | | |
|---|---|---|
| 2002/0191790 A1 | 12/2002 | Anand et al. |
| 2003/0023846 A1 | 1/2003 | Krishna et al. |
| 2003/0074388 A1* | 4/2003 | Pham et al. ............... 709/106 |
| 2003/0149883 A1 | 8/2003 | Hopkins et al. |
| 2004/0037299 A1 | 2/2004 | Pandya |
| 2004/0128553 A1* | 7/2004 | Buer et al. ............... 713/201 |

OTHER PUBLICATIONS

Cavium Networks delivers World's Fastest Security Macro Processor, Apr. 8, 2002, Retrieved from the Internet on Jun. 28, 2006: <URL; http://www.cavium.com/newsevents_sampling.html>.*

Startup offers gains in multilayer security silicon, Oct. 15, 2001, Retrieved from the Internet on Jun. 28, 2006: <URL; http://www.eetimes.com/story/OEG20011015S0059>.*

Corrent Takes Industry Lead With Delivery Of Singl-Chip Gigabit Speed Internet Security Processors, Corrent Corporaiton, Dec. 2001, Retrieved from the Internet on Jan. 7, 2006; <URL: http://corent.com/news_detail.phhp?id=46>.

Pierson, et al., Contest-Agile Encryption for High Speed Communication Networks, ACM SIGCOMM Computer communication Review, vol. 29, Issue 1 (Jan. 1999), Retrieved from the Internet on Jan. 7, 2006; <URL http://www.portal.acm.org/citation.cfm?id=505757>.

Cavium Says . . . Canny Crypto Cruncher Manifests Multiple Modes, AnalogZone, Jul. 2002, Retrieved from the Internet on Jan. 9, 2006; <URL: http://www.analgozone.com/netp0715a.htm>.

Seaway/HIFN, "Multi-Gbps Multi-Function Security Gateway System Design", Mar. 2003, pp. 15.

Young G., "Architecture powers up IIPPSec, SSL", EETimes, Jan. 4, 2002, pp. 4.

Cavium Networks, "Cavium Networks Introduces World's First Multi Service Security Processor Family," Santa Clara, CA Jul. 15, 2002, pp. 1-4.

PROQUEST, "Startup promises multilayer security silicon," Loringf Wirbel, Will Wade. Electronic Engineering Times. Mnahasset: Oct. 15, 2001, Issue 1188, pp. 3, printed on Sep. 12, 2004, proquest.umi.com/pqdweb?index=9&retrievegroup=0&sid=1&srchmod....

Young., G., "Architecute power up IPSec, SSL," Jan. 4, 2002, Business Life Manager Hifn Inc. Los Gatos, CA, Courtesey of EE Times, pp. 1-3 . . . www.eet.com/article/showArticle.jhtml?articleId=16503884. Jan., 2002.

Scholander et al., "The Effect of Algorithm-Agile Encription on ATM Quality of Services," IEEE 1997, Retrieved from the Internet on May 11, 2004: URL:http://ieeexplore.ieee.org/iel3/5002/13722/00632591.pdf?tp=&arnumber=632591&isnumber==13722.

Carlson et al., "A High Performance SSL IPSEC Protocol Aware Security Processor", IEEE, Feb. 03, Retrieved from the internet on May 11, 2004: http://ieeexplore.ieee.org/iel5/8736/27661/01234240.pdf?tp=&arnumber=1234240&isnumber=27661.

Tarman et al., "Algorithm-Agile encription in ATM Networks", IEEE, Sep. 1998, Retrieved from the Internet on May 11, 2004: http://ieeexplore.ieee.org/iel4/15348/00708451.pdf?arnumber-708451.

Secure Flow Processing Enhances QoSin Routers, EEtimes, Jun. 2002, Retrieved from the Internet on May 11, 2004: http://www.eetimes.com/story/OEG20020611S0009.

* cited by examiner

| MACRO SECURITY OPERATIONS | PRIMITIVE SECURITY OPERATIONS |
|---|---|
| SECURITY NEGOTIATION OPERATION | 2 partial hash OPERATIONS (1 MD5 and 1 SHA1) |
| KEY EXCHANGE OPERATION | 1 – RSA OPERATION<br><br>20 Hash OPERATIONS (10 MD5 + 10 SHA1) for SSL 3.0<br><br>76 Hash OPERATIONS (40 MD5 + 36 SHA1) for TLS<br><br>2 partial hash OPERATIONS<br><br>(1 MD5 and 1 SHA1) |
| FINISHED OPERATION | 1 – decrypt OPERATION (RC4 Or 3DES or DES or AES)<br><br>2 – hash OPERATIONS for MAC (either MD5 or SHA1)<br><br>4 – hash OPERATIONS (2 MD5 + 2SHA1)<br><br>4 – hash OPERATIONS (2 MD5 + 2 SHA1)<br><br>1 – encrypt OPERATION (RC4 or 3DES or DES or AES)<br><br>2 – hash OPERATIONS for MAC (either MD5 or SHA1) |
| FULL HANDSHAKE OPERATION | 1 – RSA OPERATION<br><br>20 – Hash OPERATIONS (10 MD5 + 10 SHA1) for SSL 3.0<br><br>76 Hash OPERATIONS (40MD5 + 36 SHA1) for TLS<br><br>6 – hash OPERATIONS (3MD5 + 3 SHA1)<br><br>1 – encrypt OPERATION (RC4 or 3DES or DES or AES)<br><br>6 – hash OPERATIONS (3MD5 + 3 SHA1)<br><br>1 – encrypt OPERATIONS (RC4 or 3DES or DES or AES<br><br>2 – hash OPERATIONS for MAC (either MD5 or SHA1) |

*Fig. 4*

APPARATUS AND METHOD FOR ALLOCATING RESOURCES WITHIN A SECURITY PROCESSOR

BACKGROUND

1. Field of the Invention

This invention relates generally to the field of data processors. More particularly, the invention relates to a network security processor which provides for an intelligent and efficient allocation of processing and queuing resources.

2. Description of the Related Art

Communication networks and the number of users of such networks continue to increase. Moreover, on-line sales involving both business-to-business and business-to-consumer transactions over the Internet continues to proliferate. Additionally, the number of people that are telecommuting continues to grow. Both on-line sales and telecommuting are examples of the usage of communication networks that typically involves private and sensitive data that needs to be protected during transmission.

Accordingly, security protocols such as Transport Layer Security (TLS), Secure Sockets Layer (SSL) 3.0, and Internet Protocol Security (IPSec) have been developed to establish secure sessions between remote systems. These security protocols allow remote systems to establish a secure session through message exchange and calculations, thereby allowing sensitive data being transmitted across the different communication networks to remain secure and untampered.

FIG. 1 illustrates an exemplary two phase client-server or peer-to-peer exchange to establish a secure session. In a first phase 105, the security negotiation phase, a network element 101 (the client or the first peer) and a network element 103 (the server or the second peer) exchange messages to negotiate security between the two network elements 101 and 103. The negotiation of security includes determining the algorithms (e.g., hashing algorithms, encryption algorithms, compression algorithms, . . . etc) to be employed by the two network elements 101 and 103. In a second phase 107, a key exchange phase, the network elements 101 and 103 exchange key information. The second phase 107 comprises the network elements 101 and 103 exchanging messages based on a selected public key algorithm and authenticating received messages. While the specific primitive tasks of these two phases vary for different security protocols, the primitive tasks for establishing a secure session can include the receiving of messages, transmitting of messages, generating of keys, generating of secrets, hashing of data, encrypting of data, decrypting of data, and calculating of random numbers.

Performing the tasks to establish a secure session is processor-intensive. If a general purpose processor acting as the host processor for a network element, performs these tasks, then the network element's system performance will suffer because processing resources will be consumed for the tasks. The results of poor system performance can impact a network and users in various ways depending on the function of the network element (e.g., routing, switching, serving, managing networked storage, . . . etc).

Security coprocessors have been developed to offload some of the tasks from the host processor. FIG. 2 illustrates an exemplary architecture for a security processor 200 which includes multiple execution cores 240. The network element 205 shown in FIG. 2 (e.g., a router, gateway, switch, . . . etc) transmits security operation requests to the security processor 200 via an I/O interface 210 (e.g., a PCI interface). The security requests are initially placed in an input queue 222. An execution core scheduler 230 reads the security requests from the input queue in sequence and farms out the security requests to each of the execution cores 240. For example, each execution core 240 may process a single security request at a time and the execution core scheduler may farm out individual security requests in a round-robin fashion. When an execution core 240 completes a security request, the results of the request are placed in an output queue 220 and provided to the network element 205 via the I/O interface. Various techniques for transmitting and queuing data between the network element and the host processor may be employed such as, for example, direct memory access ("DMA") read/write operations.

The execution cores may be programmed with microcode to process different types of security operations such as SSL, IPSEC, or XML Digital Signature ("DSig") operations. One example of an execution core 300, illustrated in FIG. 3, includes a microcode block 301, a microcontroller block 303, and an execution queue block 305. The microcontroller block 303 executes microcode stored within the microcode block 301. In one embodiment, the microcontroller block translates each security operation into one or more primitive security operations which are then distributed to execution queue block 305. Different microcode blocks may be loaded within the execution core 300 (e.g., via a driver when the system is powered up). For example, one type of microcode block may be specifically adapted for processing SSL operations whereas another type of microcode block may be adapted for processing IPSEC operations. By way of example, and not limitation, several different security operations are illustrated in the table in FIG. 4 along with their associated primitive security operations.

The execution queue block 305 is coupled to a set of primitive security operation blocks including, by way of example and not limitation, an Advanced Encryption Standard (AES) block 307, a Triple Data Encryption Standard (3DES) block 309, a modular exponentiation block 311, a hash block 313, a simple arithmetic and logic block 315, and an alleged RC4® block 319. Alternative implementations may include additional primitive security operation blocks or fewer primitive security operation blocks. A bus 321 couples the primitive security operation blocks 307, 309, 311, 313, and 319 and the register file block 317 together.

The input data for the operation (if any) is copied from the I/O interface 210 to the register file 317. The microcontroller block 303 retrieves the appropriate control information (if any) from the register file 317. The microcontroller block 303 places the necessary primitive security operations into the execution queue 305 for transfer to the security operation blocks 307, 309, 311, 313, 315, or 319. Once a primitive security operation block 307, 309, 311, 313, 315, or 319 has executed the primitive security operation, the results are copied to the register file 317. The results of the security operation (be it a macro or a primitive security operation), are then placed in the output queue 220 and transmitted to the network element 205 via the I/O interface 210 (e.g., by way of a DMA transfer to the appropriate location within the network element 205).

Current security processor configurations, such as those described above, are incapable of concurrently processing different types of data traffic and thereafter dynamically adapting to changes in data traffic. For example, current security processor configurations are incapable of concurrently processing both IPSEC and SSL data traffic. Moreover, no mechanisms currently exist for dynamically real-locating processing resources in response to relative changes in the processing requirements for each security protocol.

Moreover, security coprocessors today are not capable of guaranteeing a specified level of service or bandwidth for certain types of secure data traffic.

BRIEF DESCRIPTION OF THE DRAWINGS

A better understanding of the present invention can be obtained from the following detailed description in conjunction with the following drawings, in which:

FIG. 4 illustrates an exemplary set of macro security operations and corresponding primitive security operations.

DETAILED DESCRIPTION

A multi-service, multi-protocol security apparatus and method are described which provide guaranteed bandwidth and dynamic provisioning for secure data traffic. In the following description, numerous specific details are set forth to provide a thorough understanding of the invention. However, it is understood that the invention may be practiced without these specific details. In other instances, well-known circuits, structures and techniques have not been shown in detail in order not to obscure the invention.

One Embodiment of the Invention

The security processing architecture described below concurrently supports multiple security algorithms including, but not limited to the IP Security ("IPSEC"), Secure Sockets Layer ("SSL") and XML Digital Signature ("XML DSig") security protocols. In addition, in one embodiment of the security processing architecture, specified security processing resources are allocated between the different security algorithms. For example, 40% of the security processing resources may initially be allocated to processing SSL data traffic while the remaining 60% may be allocated to processing IPSEC data traffic. Moreover, in one embodiment, following the initial security processing resource allocations, the security processing resources may be dynamically reallocated, based on variables such as data traffic load associated with each protocol and based on specified resource allocation parameters. Finally, one embodiment of the security processing architecture reserves certain processing resources to a particular type of service and/or protocol, thereby guaranteeing bandwidth availability for that service and/or protocol.

The term "resources" is used broadly herein to mean any element or mechanism within the security processor related to the processing or storage of data. For example processing resources may include execution cores within the security processor. Similarly, queuing resources or memory resources may include the number of queues or the amount of memory space allocated to a particular protocol or service.

Resource Allocation

Figure 1:
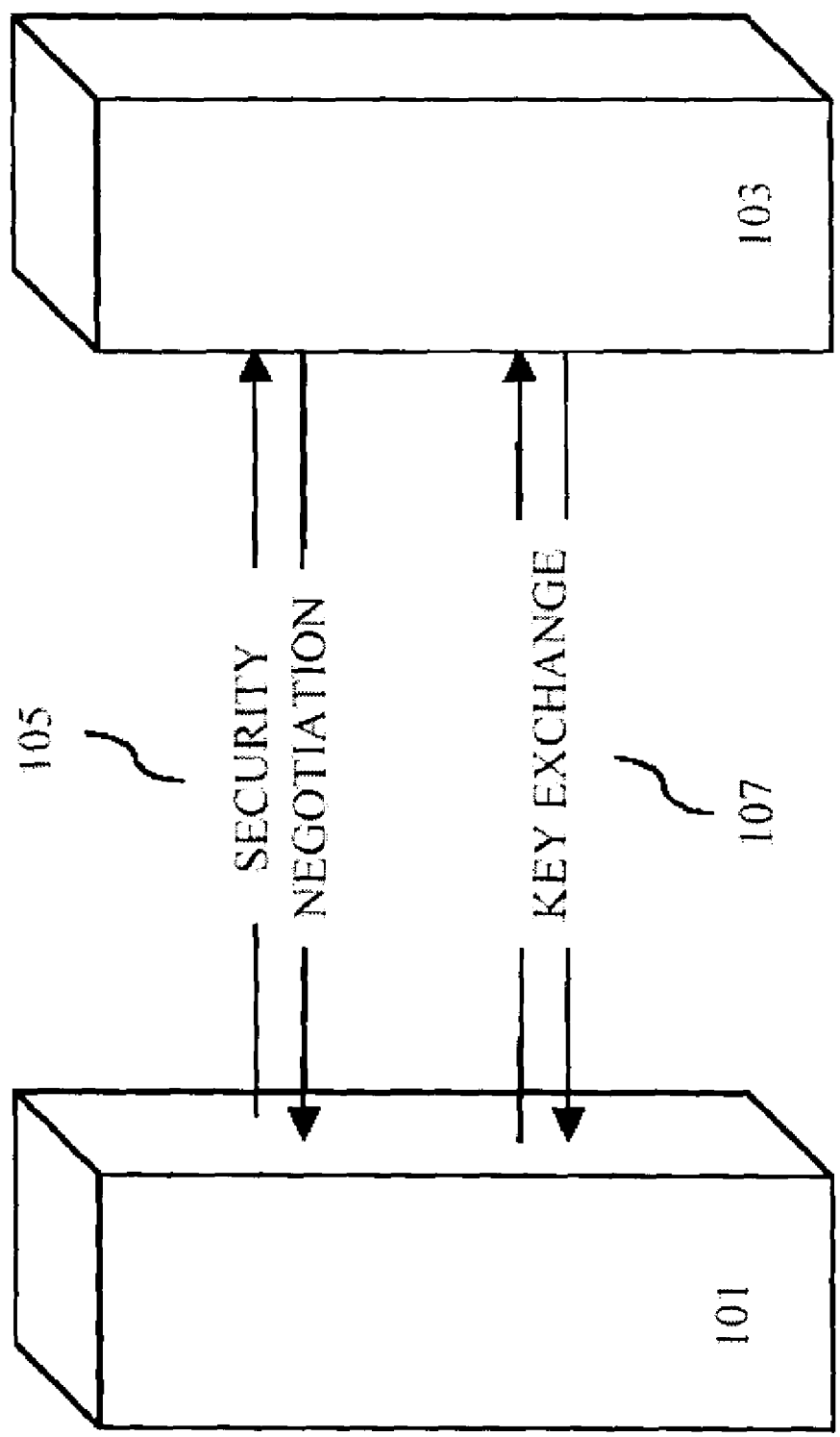
FIG. 1 illustrates a two phase client/server exchange to establish a secure session.
Figure 2:
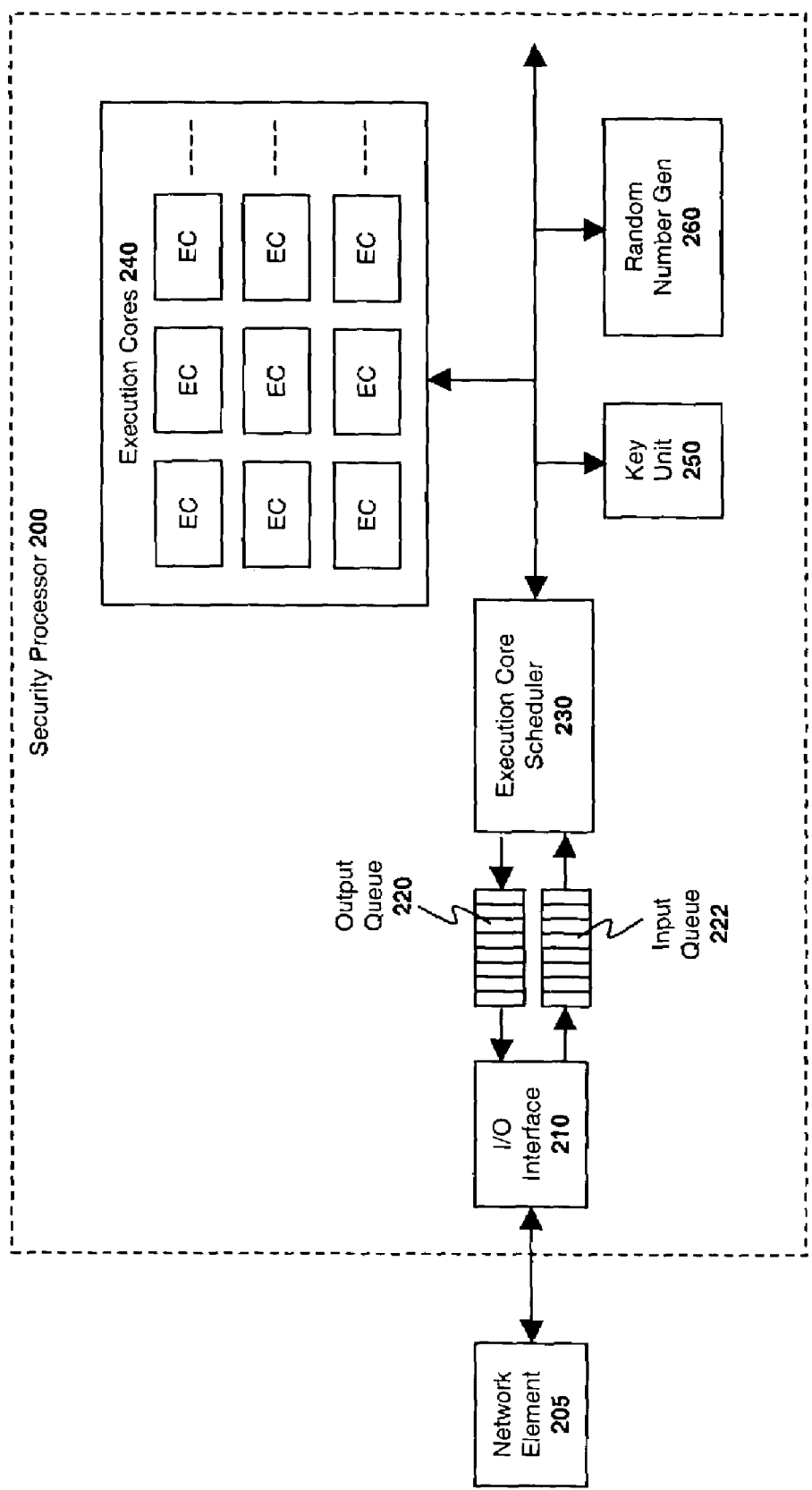
FIG. 2 illustrates an exemplary prior art system for processing security operations.
Figure 3:
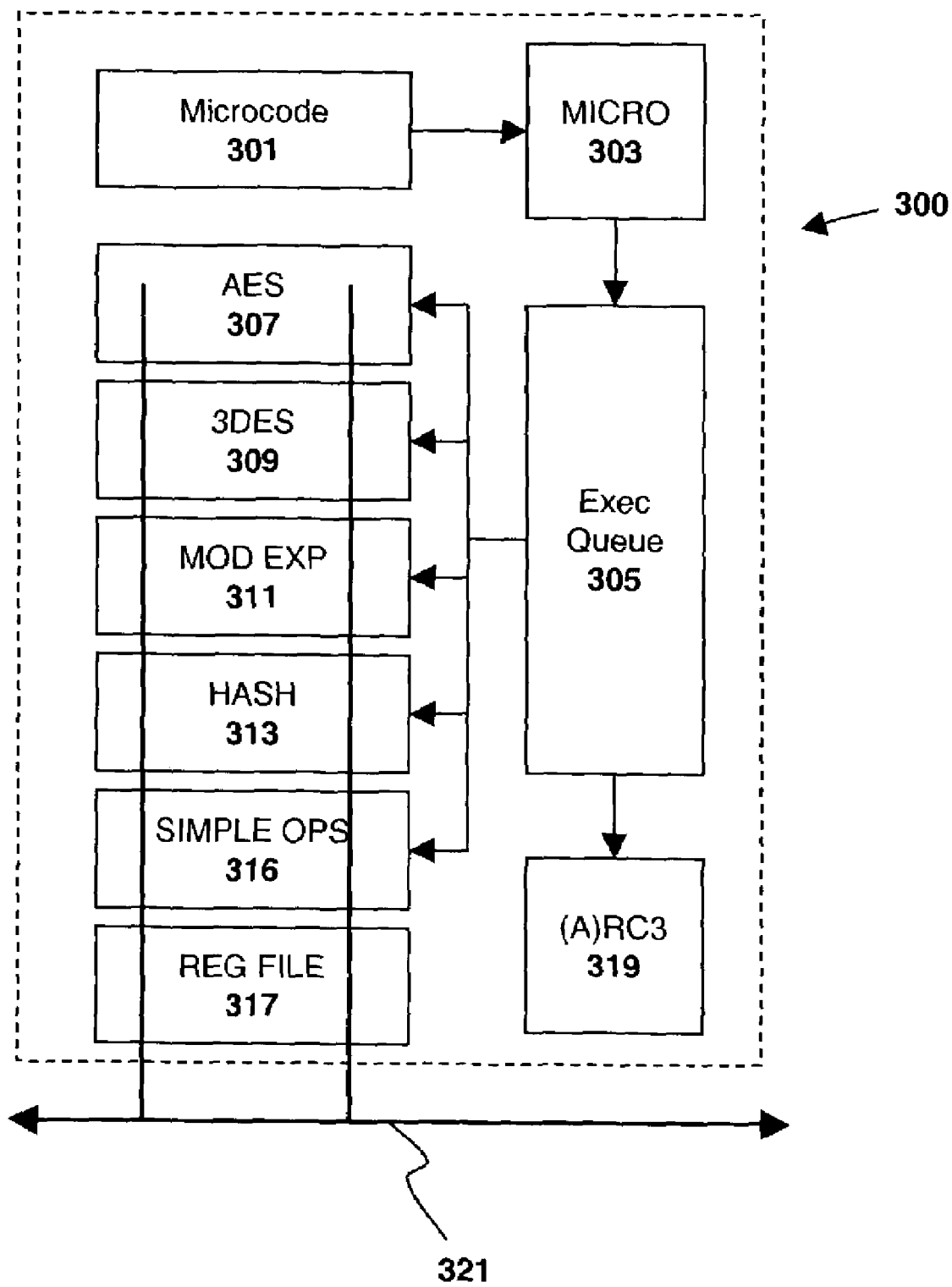
FIG. 3 illustrates an exemplary execution core employed in the prior art and in one embodiment of the invention.
Figure 5:
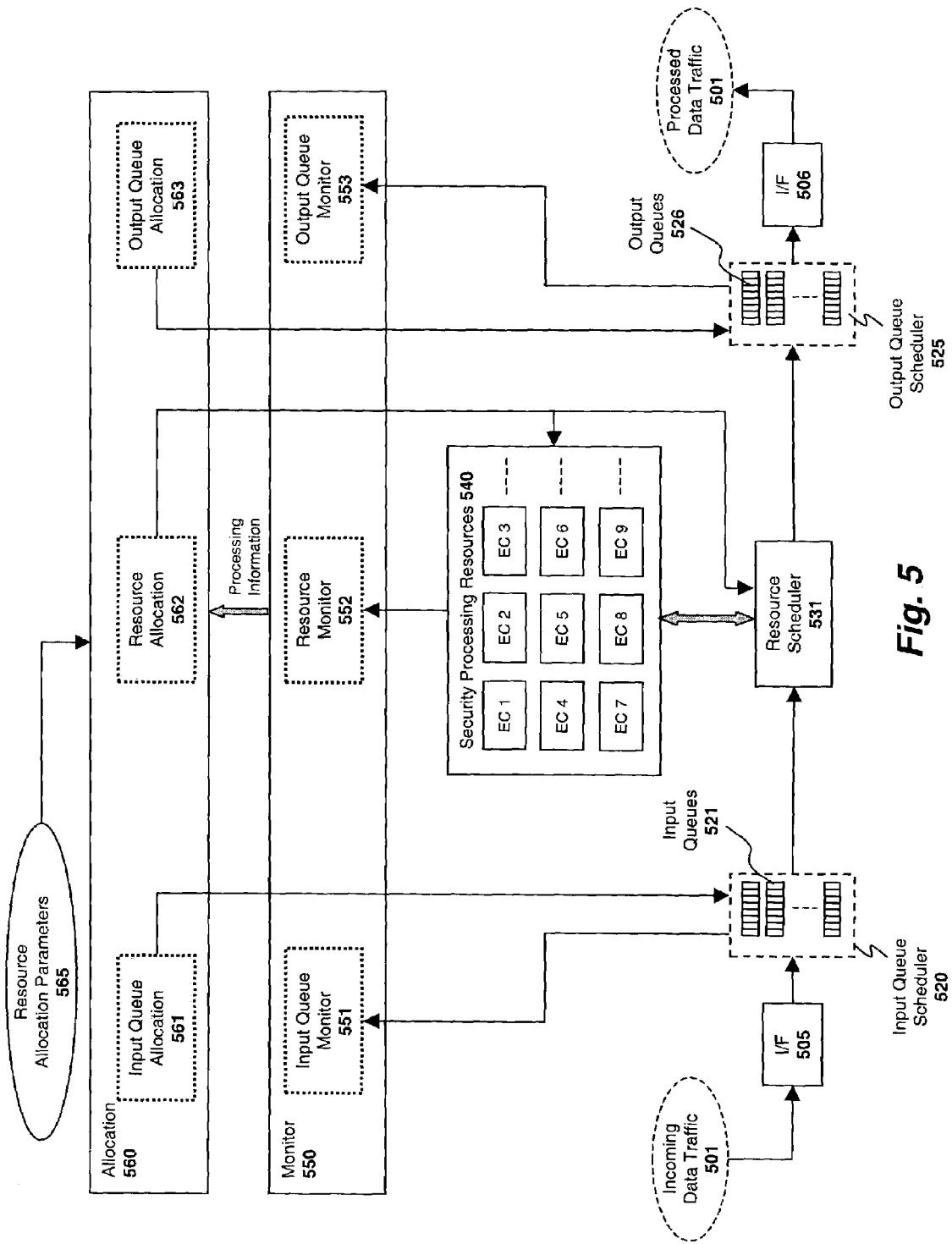
FIG. 5 illustrates one embodiment of the invention for dynamically allocating processing resources and input/output queues.

A security processor including an exemplary set of security processing resources 540 and queuing resources 521, 526 is illustrated in FIG. 5. In one embodiment, the security processing resources 540 are a plurality of execution cores EC1–EC9 which implement base cryptographic operations such as DES/3DES, AES, RC4, SHA-1, MD5, and modular exponentiation, such as those illustrated in FIGS. 2–3 above. However, the underlying principles of the invention are not limited to an implementation which employs multiple "execution cores." For example, the resources of a single processor or a single execution unit may also be allocated (e.g., using time-division allocation techniques) while still complying with the underlying principles of the invention.

The embodiment illustrated in FIG. 5 includes an allocation module 560 and a monitor module 550. The allocation module 560 includes an input queue allocation module 561, a processing resource allocation module 562 and a output queue allocation module. The monitor module 550 includes an input queue monitor module 551, a processing resource monitor module 552 and an output queue monitor module 553. The monitor module 550 and the allocation module are communicatively coupled, as indicated, such that data traffic and processing information gathered by the monitor modules 551–553 may be provided to any one of the allocation modules 561–561 during runtime. The operation of each of these modules will be described in greater detail below.

Incoming data traffic 501 is provided to the security processor via input interface 505. Various different types of interfaces may be employed including, by way of example and not limitation, a peripheral component interconnect ("PCI") interface, a System Packet Interface Level 3 ("SPI-3"), or a System Packet Level 4 ("SPI-4") interface. The incoming data traffic 501 may be in the form of IPSEC packets, SSL packets, XML DSig packets, proprietary data packets generated by a network processing element (e.g., a network processor), or may be in any other data format. The underlying principles of the invention are not limited to a particular interface or a particular packet transmission format.

In one embodiment, data packets are provided over the interface 505 to an input queue scheduler 520 which selects an input queue for each data packet. As described in greater detail below, the input queue scheduler 520 operates under the control of the input queue allocation module 561. A processing resource scheduler 530 reads the data packets from each of the input queues 521 and schedules the data packets for processing by the security processing resources 540. The processing resource scheduler 530 operates under the control of the processing resource allocation module 562. Data packets which have been processed are provided to an output queue scheduler 525 which places each processed data packet in an appropriate output queue 526, based on control signals provided from the output queue allocation module 563.

The output queue scheduler 525 transmits the processed data packets to an external network element (not shown) over a communication interface 506. Once again, the interface 506 may be any type of interface suitable for communicating data including a PCI interface, a SPI-3 interface or a SPI-4 interface. In one embodiment, interface 505 and interface 506 are actually the same bi-directional interface (i.e., capable of both receiving unprocessed data packets and transmitting processed data packets).

In one embodiment of the invention, a specified set of resource allocation parameters 565 provides an indication of how the allocation module 560 should allocate the security processing resources 540 and the queues 520, 525 both initially, and in response to changes in data traffic detected by the monitor module 550. For example, the processing resource allocation module 562 may be configured to initially reserve execution cores EC1 through EC3 for processing SSL traffic only and to initially reserve execution cores EC4 through EC9 for processing IPSEC traffic only. As a result, when the security processor is initialized, SSL-based microcode will initially be loaded into EC1 through EC3 and IPSEC-based microcode will initially be loaded into EC4 through EC9. The end result is that a guaranteed level of security processing bandwidth is initially allocated for each type of security protocol supported by the security processor.

In addition to allocating security processing resources 540, the input queue allocation module 561 (in response to the allocation parameters 565) may associate each of the input queues 521 with a particular execution core EC1–EC9. Returning to the example above, three input queues may be associated with the three execution cores EC1–EC3 configured with SSL-based microcode, and six input queues may be associated with the six execution cores EC-4–EC9. Thus, in one embodiment, each execution core will be associated with its own input queue. The input queue scheduler 520 then forwards SSL data packets to each of the three input queues associated with execution cores EC1–EC3 and forwards IPSEC data packets to each of the six input queues associated with execution cores EC4–EC9. In one embodiment, the input queue scheduler 520 employs a round-robin algorithm to fill the input queues 521 (i.e., alternating between each of the input queues in sequence as new data packets arrive).

In one embodiment, the input and output "queues" are not discrete storage elements. Rather, they are defined, addressable memory blocks within a single, contiguous memory space (e.g., such as SDRAM, DDRAM or RDRAM). Thus, in this embodiment, different input and output queue sizes may be selected based on protocol type or based on a designated level of service, as described in more detail below. For example, a threshold may be specified for each input and/or output memory indicating the percentage of the total available memory space that different types of data traffic are permitted to consume. If the data within the queue or memory exceeds the defined threshold, then no additional data may be placed in the queue/memory until space within the queue/memory is freed (e.g., until additional packets are processed and transmitted out through the interface 506).

In one embodiment, one contiguous block of memory may be defined for all SSL traffic and another block of memory may be defined for all IPSEC traffic. In this embodiment, the input queue scheduler 520 will transfer all SSL-based data into the memory block designated for SSL traffic and will transfer all IPSEC-based data into the memory block designated for IPSEC traffic.

The processing resource scheduler 531 may then read data packets from each defined memory space (e.g., in the order in which the packets are received) and provide them to the appropriate execution cores in a round robin manner (or as execution units become available). Returning again to the previous example, the processing resource scheduler 531 will transfer SSL-based data packets from the first defined memory space to execution units EC1–EC3 and will transfer IPSEC-based data packets from the second defined memory space to execution cores EC4–EC9. It should be noted, however, that the underlying principles of the invention are not limited to any particular queuing or memory management techniques.

In one embodiment, the data stored within the input queues 521 and output queues 526 does not include the actual data to be processed by the security processing resources (e.g., the underlying encrypted/decrypted content). Rather, to conserve space within the queues, the data stored within the queues may include only packet header information or pointers which identify the location of the underlying data and/or other pertinent information about the data (e.g., the security protocol used to encrypt the data, the level of service associated with the data, the type of content included within the data, . . . etc). When an execution core is available to process the data, the resource scheduler 531 and/or the relevant execution core then uses the header information to identify and retrieve the data for processing. In one embodiment, the security processor is equipped with an input memory (not shown) for storing the underlying data before it is processed and an output memory (not shown) for storing the data after it has been processed. In one embodiment, the input and output memories are configured within an external memory (e.g., under the control of a host processor). Data which has been processed by the execution cores is stored within the output memory until it is transmitted out over the interface 506. In one embodiment, the monitor module 550 monitors the amount of data stored within the input memory and/or output memory, either in addition to, or in lieu of monitoring the data within the input and/or output queues 521 and 526, respectively.

In one embodiment, resource allocation is based on variables other than merely the security protocol type (e.g., IPSEC, SSL, XML DSig, . . . etc). For example, in one embodiment, the initial allocations are based on a service type associated with the data (either in addition to, or in lieu of allocations based on security protocol type). For example, in one embodiment, different quality of service ("QOS") levels may be defined for different types of content. Voice data traffic, or other real-time data traffic, for example, may be assigned a relatively higher level of service than standard data traffic. In addition, different service levels may be specified for different customers. For example, certain customers may be willing to pay a relatively higher price for a relatively higher level of guaranteed security processing bandwidth.

Thus, returning to the previous example, the three execution cores EC1–EC3 allocated to SSL traffic may be further divided based on defined priority/service levels. For example, the processing resource allocation module 562 may initially allocate EC1–EC2 to "high" priority data traffic (e.g., voice data traffic and/or a data traffic having a relatively higher guaranteed bandwidth level), whereas it may initially allocate only EC1 to relatively "low" priority data traffic (e.g., standard data traffic or data traffic having a relatively lower service level). The six execution cores allocated to IPSEC traffic may similarly be divided based on priority/service level. For example, the processing resource allocation module 540 may initially allocate EC4–EC7 to "high" priority data traffic, whereas it may initially allocate only EC8–EC9 to relatively "low" priority data traffic (e.g., standard data traffic or data traffic having a relatively lower service level).

In one embodiment, the input queue allocation module 561 and the output queue allocation module 563 make corresponding allocations to the input and output queues 521 and 526, respectively. For example, a relatively larger block of memory may initially be allocated to the higher priority data traffic and a relatively smaller block of memory may initially be allocated to the lower priority data traffic.

Dynamic Provisioning

As mentioned above, one embodiment of the invention provides for dynamic provisioning of security processing resources. Accordingly, once the initial security processing and queue allocations have been made (as described above), data traffic is continually monitored and analyzed to determine whether a more efficient allocation is possible, taking the guaranteed bandwidth constraints into account. If a more efficient allocation is possible, then the processing resources are reallocated dynamically (i.e., in real-time, without powering down and reconfiguring the security processor).

Specifically, the monitor module 550 continually tracks input queue usage via an input queue monitor 551 and output queue usage via output queue monitor 553. The amount of data stored within each queue provides an indication of the relative load on the execution unit serviced by that queue and also the relative amount of data traffic associated with a particular security protocol and/or service level. For example, if a queue used to store IPSEC traffic has reached its threshold value, then this may indicate that the resources currently allocated to IPSEC traffic are not sufficient. In addition, in one embodiment, a resource monitor 552 is configured to directly monitor the usage of each of the execution cores to identify the relative load for each protocol and/or service.

Regardless of how the relative load associated with each protocol and/or service level is measured, in one embodiment, it is provided to the allocation module 560 which uses it to dynamically reallocate the security processing resources 540 and/or the input and output queues, 521 and 526, respectively, associated with each protocol and/or service level. Returning to the above example, execution cores EC1–EC3 may initially be allocated to processing SSL traffic and execution cores EC4–EC9 may initially be allocated to processing IPSEC traffic. Over time, however, the execution cores EC1–EC3 allocated to SSL traffic may become overloaded (e.g., as measured by the input or output queue monitors, 551 or 553, respectively, or the resource monitor 552).

As such, in one embodiment, the allocation module 560 compares the load the execution cores EC1–EC3 and the queues dedicated to SSL with the load on the execution cores EC4–EC9 and the queues dedicated to IPSEC. Instead of a direct comparison, the allocation module 560 may simply evaluate the load on the execution cores EC4–EC9 and the queues dedicated to IPSEC. If the load on EC4–EC9 is below some specified threshold value, then the processing resource allocation module 562 will automatically reallocate one or more of the execution cores from EC4–EC9 to the SSL group, EC1–EC3, to process SSL traffic. In one embodiment, the specified "threshold" is a determination that, if the execution cores are reallocated from EC4–EC9, there will still be sufficient number of execution cores to handle the IPSEC data traffic (i.e., based on the minimum defined bandwidth requirements).

In addition, the input queue allocation module 561 may direct the input queue scheduler 520 to reallocate one or more input queues (or memory blocks) from IPSEC traffic to SSL traffic, and the output queue allocation module 563 may direct the output queue scheduler 525 to reallocate one or more output queues (or memory blocks) from IPSEC traffic to SSL traffic.

In one embodiment, even if a potentially more "efficient" resource allocation is possible, guaranteed bandwidth constrains may limit the manner in which resources may be reallocated. For example, if a specified amount of processing and queuing/memory bandwidth is guaranteed for IPSEC data traffic, then an execution core and associated queues/memory will not be removed from the group dedicated to IPSEC data traffic if doing so would cause the available processing bandwidth to drop below the guaranteed threshold value, even if the execution cores and queues/memory dedicated to other types of data traffic are overloaded relative to the IPSEC execution cores.

Resources may be intelligently provisioned based on defined service levels as well. For example, in one embodiment, the resource/queuing allocation parameters 565 may specify a guaranteed level of throughput for a particular, heightened service level, at the sacrifice of all subordinate service levels. Thus, in this embodiment, resources dedicated to the heightened service level (e.g., associated with a particular customer) may not be reallocated unless sufficient resources are available to guarantee the defined level or processing and/or queuing bandwidth.

It should be noted that the specific examples set forth above are for the purpose of illustration only and should not be read to limit the scope of the invention. A virtually unlimited number of resource allocations based on security protocol and/or service level may be defined while still complying with the underlying principles of the invention.

In one embodiment, the allocation module 560, the monitor module 550 and the resource allocation parameters 565 are implemented in software. For example, each of these modules and associated data may be programmed within a software driver executed on a host processor (not shown). However, the underlying principles of the invention are not limited to a software implementation. For example, the allocation module 560, the monitor module 550 and the resource allocation parameters 565 may also be embodied in hardware or firmware, directly within the security processor architecture.

A Second Embodiment of the Invention

Another embodiment of the invention will now be described with respect to FIGS. 6–8*c*. This embodiment logically separates the processing of security data into a mainline processing pipeline and a dynamic provisioning pipeline. Pertinent aspects of the mainline processing pipeline will now be briefly described with respect to FIGS. 6 and 7.

Figure 6:
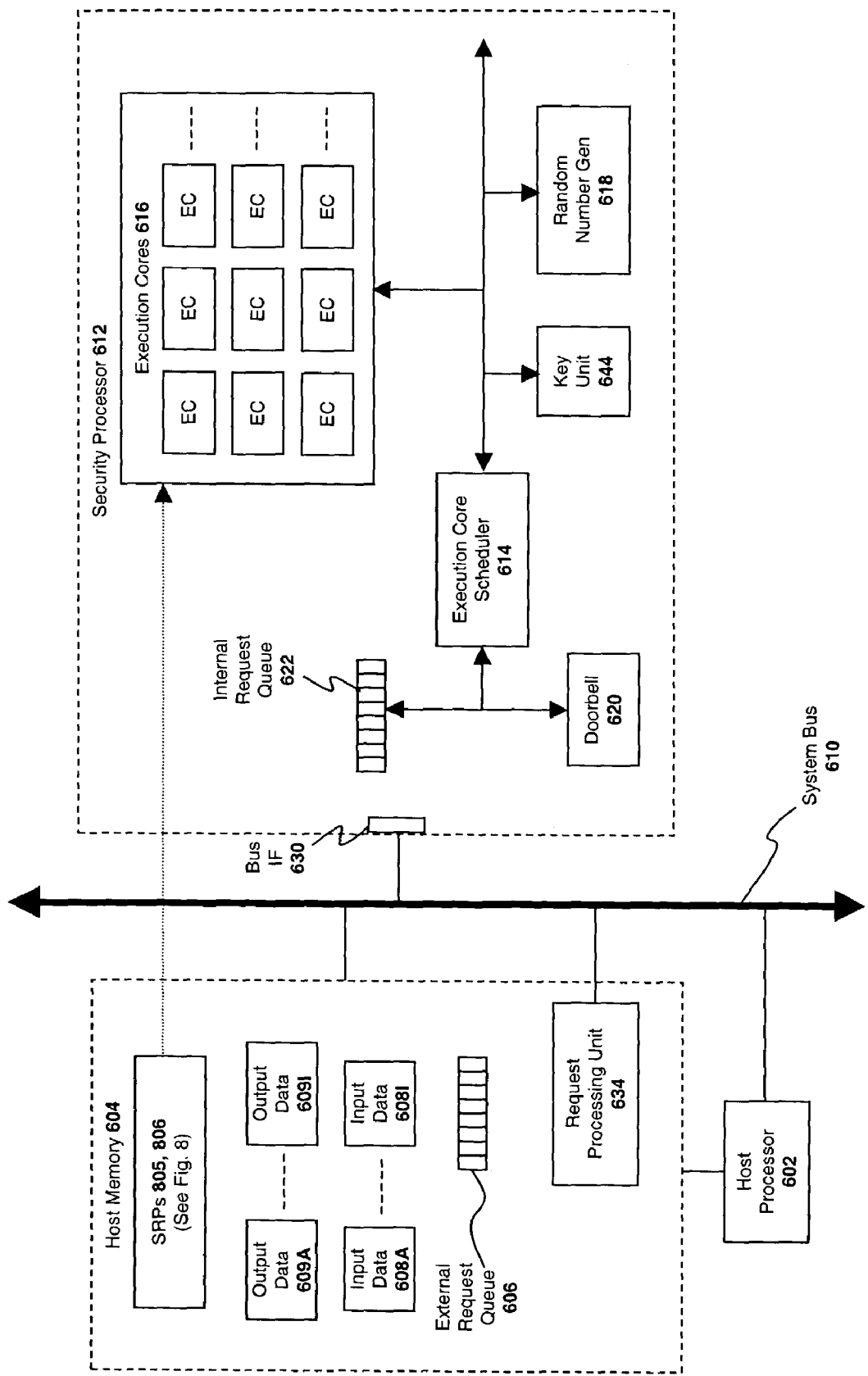
FIG. 6 illustrates a mainline processing architecture employed in one embodiment of the invention.

The embodiment illustrated in FIG. 6 includes a host processor 602, a host memory 604, a security processor 612 and a request processing unit 634. Host processor 602, host memory 604 and security processor 612 are communicatively coupled to system bus 610. In one embodiment, request processing unit 634 is a process or task which resides within the host memory 604 and is executed within host processor 602. For example, request processing unit 634 may be a software driver for the security processor 612 executed by the host processor 602 and used to coordinate security services provided by the security processor 612 (e.g., the driver may interface with Open SSL).

An external request queue 606, input data 608A–608I and output data 609A–609I are maintained within the host memory 604. In one embodiment, the external request queue 606 is a circular queue (e.g., a ring buffer) for storing security processing requests to be processed by the security processor 612. The write pointer for the external request queue 606 is maintained by the request processing unit 634 and the read pointer for the external request queue 606 is maintained by an execution core scheduler 614 of security processor 612. Accordingly, the request processing unit 634 increments its write pointer when storing security processing requests into external request queue 606, while execution core scheduler 614 decrements its read pointer when extracting or retrieving requests from external request queue 606.

In one embodiment, input data 608A–608I, output data 609A–609I, and/or entries in the external request queue 606 are each contiguously stored in host memory 604. Accordingly, blocks of data and/or security requests may be written or read from these storage locations using direct memory access ("DMA") read and/or write operations. For example, the execution core scheduler 614 within security processor 612 may extract the input data across multiple requests using one direct memory access ("DMA") read operation. Of course, the underlying principles of the invention are not limited to any particular memory access scheme.

In one embodiment, security processing requests inserted into the external request queue 606 by request processing unit 634 include instructions, such as an operation code, which are associated with (e.g., point to) one of the input data 608A–608I. In one embodiment, these requests are 32 bytes in size. The types of requests can comprise different security operations including both macro-security operations such as key exchange and security negotiation operations and/or primitive security operations such as requests to generate a random number, generate a prime numbers, perform modular exponentiation, perform a hash operation, generate keys for encryption/decryption, perform a hash-message authentication code ("H-MAC") operation, perform a handshake hash operation and perform a finish/verify operation. As used herein, a single macro security operation may be comprised of multiple primitive security operations.

Figure 7:
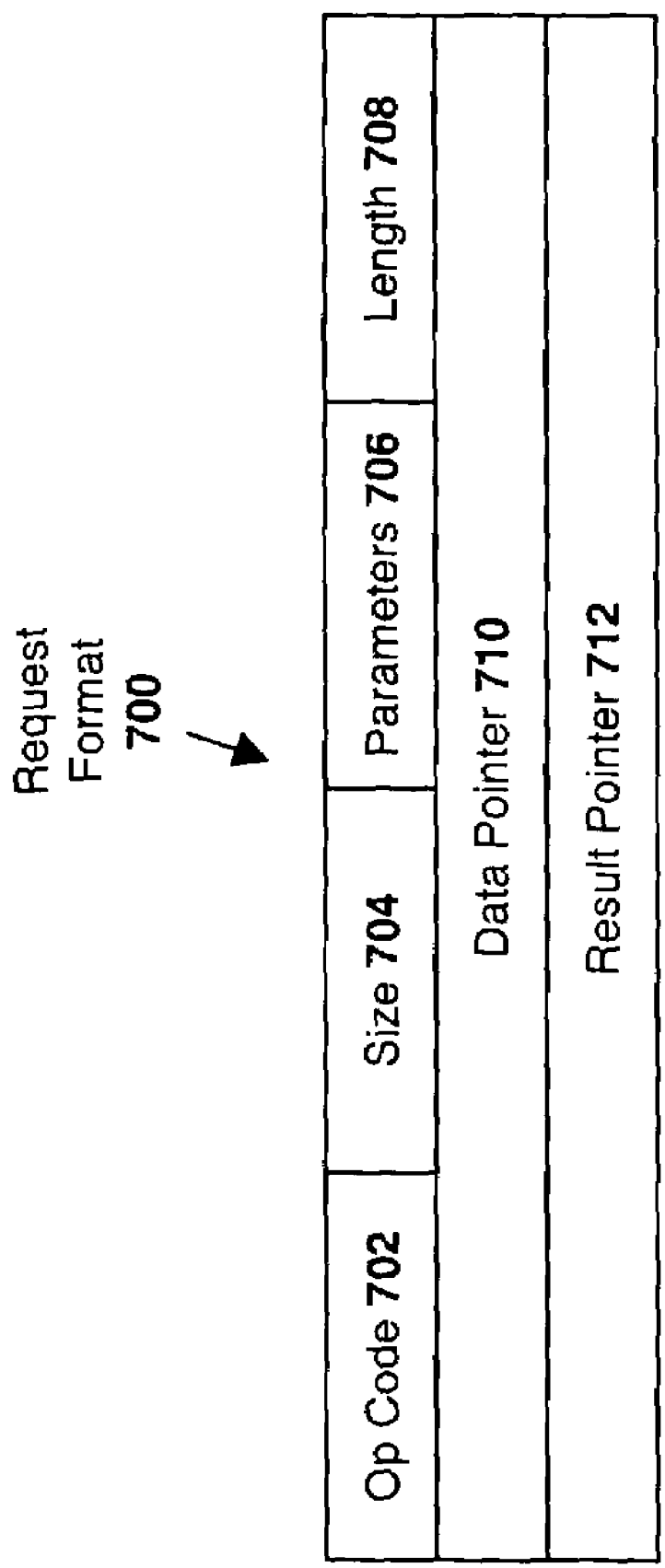
FIG. 7 illustrates a request header format employed in one embodiment of the invention.

FIG. 7 illustrates an exemplary request data format 700 which may be stored in the external request queue 606 for processing by security processor 612. In particular, FIG. 7 illustrates request format 700 that includes operation code 702, size 704, parameters 706, data length 708, data pointer 710 and result pointer 712. Operation code 702 includes the op-code to identify the different security operations to be performed by security processor 612, such as an op-code for hashing, modular exponentiation, etc. Size 704 can define sizes for different data related to the operation depending on the type of operation. For example, size 704 for a modular exponentiation operation could include the size of the modulus or for a hash operation could include the size of the data to be hashed.

Similar to the size 704, the parameters 706 define different data related to the operation depending on the type of operation. For example, for the operation for the generation of keys for encryption/decryption, the parameters 706 could define the length of the pre-master for the key.

Data length 708 defines the length of the data structure within the associated input data 608A–608I that is pointed to by data pointer 710 (within the request) and copied into security processor 612 for the security operation defined within the request. The data structure stored in the associated input data 608A–608I and pointed to by the data pointer 710 may include different data depending on the type of security operation to be performed. In one embodiment, for given operations, this additional data structure is not needed, thereby making data pointer 710 unused. For example, for the operation to generate a random number, there is no input data stored within one of input data 608A–608I. To help illustrate the type of data to be stored within such data structures, for a key generation operation, the data structure could include the client random number, the server random number, the label and the pre-master number.

The result pointer 712 defines the location (one of output data 609A–609I) within host memory 604 where security processor 612 can write output results into a data structure. Returning to the key generation operation to help illustrate, the data structure stored in the associated output data 609A–609I could include the master key, the key material and the completion code.

Returning to FIG. 6, the security processor 612 includes a bus interface 630 over which the security processor and host processor 602 communicate. In one embodiment, the bus interface 630 is a PCI bus interface (i.e., and the system bus 610 is a PCI bus). However, various alternate I/O schemes may be employed while still complying with the underlying principles of the invention. For example, the bus interface 630 may be a SPI-3/SPI-4 interface, a HyperTransport interface (also known as Lightening Data Transport), a 3GIO interface, or a Rapid I/O ("RIO") interface. The security processor 612 also includes a key unit 644, execution core scheduler 614, doorbell register 620, a plurality of execution cores 616, a random number generator 618 and an internal request queue 622.

As mentioned above, security processing requests generated by the host processor 602 are initially stored within the external request queue 606 managed by the request processing unit 634. As described above in conjunction with FIG. 7, requests can include the operation code to be performed by units within security processor 612, a pointer to other data related to the operation that is stored in one of input data 608A–608I and a pointer to the location in the host memory 604, such as the output data 609A–609I, where the output results are to be placed by the security processor 612 after completion of the given request.

The request processing unit 634 then writes the number of request(s) added into external request queue 606 to doorbell register 620 located on security processor 612. Although described as a "register," the data to be stored in doorbell register 620 may include any other type of memory within security processor 612.

In one embodiment, the execution core scheduler 614 polls the doorbell register 620 to determine the number of pending security requests within the external request queue 606. Polling may occur periodically (e.g., every clock cycle). Upon detecting that the external request queue 606 includes security requests, the execution core scheduler 614 then determines whether any one of execution cores 616 is available to process the requests and/or whether space is available within internal request queue 622 to store the requests. If so, the execution core scheduler 614 transfers the requests (e.g., via a DMA transfer) to the internal request queue 622. The execution core that receives the request (one of the group 616) retrieves the input data 608A–608I associated with the requests from the host memory 604.

The execution core scheduler 614 then farms out each of the requests in succession to the execution cores 616. Because, in one embodiment, each execution unit 616 is capable of processing any one of the different types of security operations, the execution core scheduler 614 is able to transmit a request to the first of the execution cores 616 that becomes available. The execution core scheduler 616 continues to transfer each request in succession to the next available execution core until all of the requests are processed.

Once an execution cores 616 completes the processing of the request, the execution core 616 stores the result of the request in the location (one of output data 609A–609I) in host memory 604 pointed to by result pointer 612 of the request (shown in FIG. 7). The result is subsequently read from memory by the host processor.

Resource Allocation

Figure 8A:
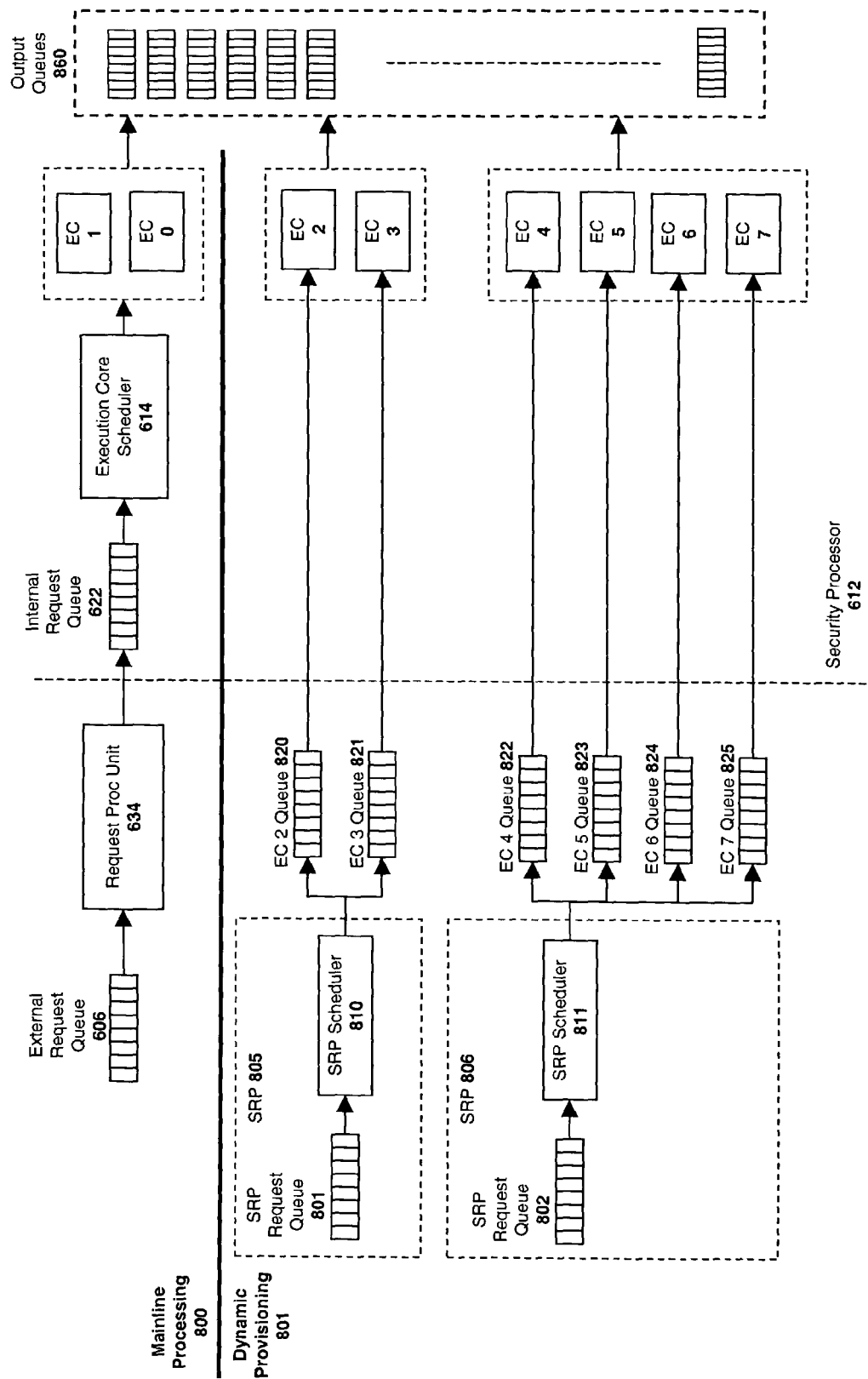
FIGS. 8a–b illustrate one embodiment of the invention which includes a mainline processing component and a dynamic processing component.
Figure 8B:
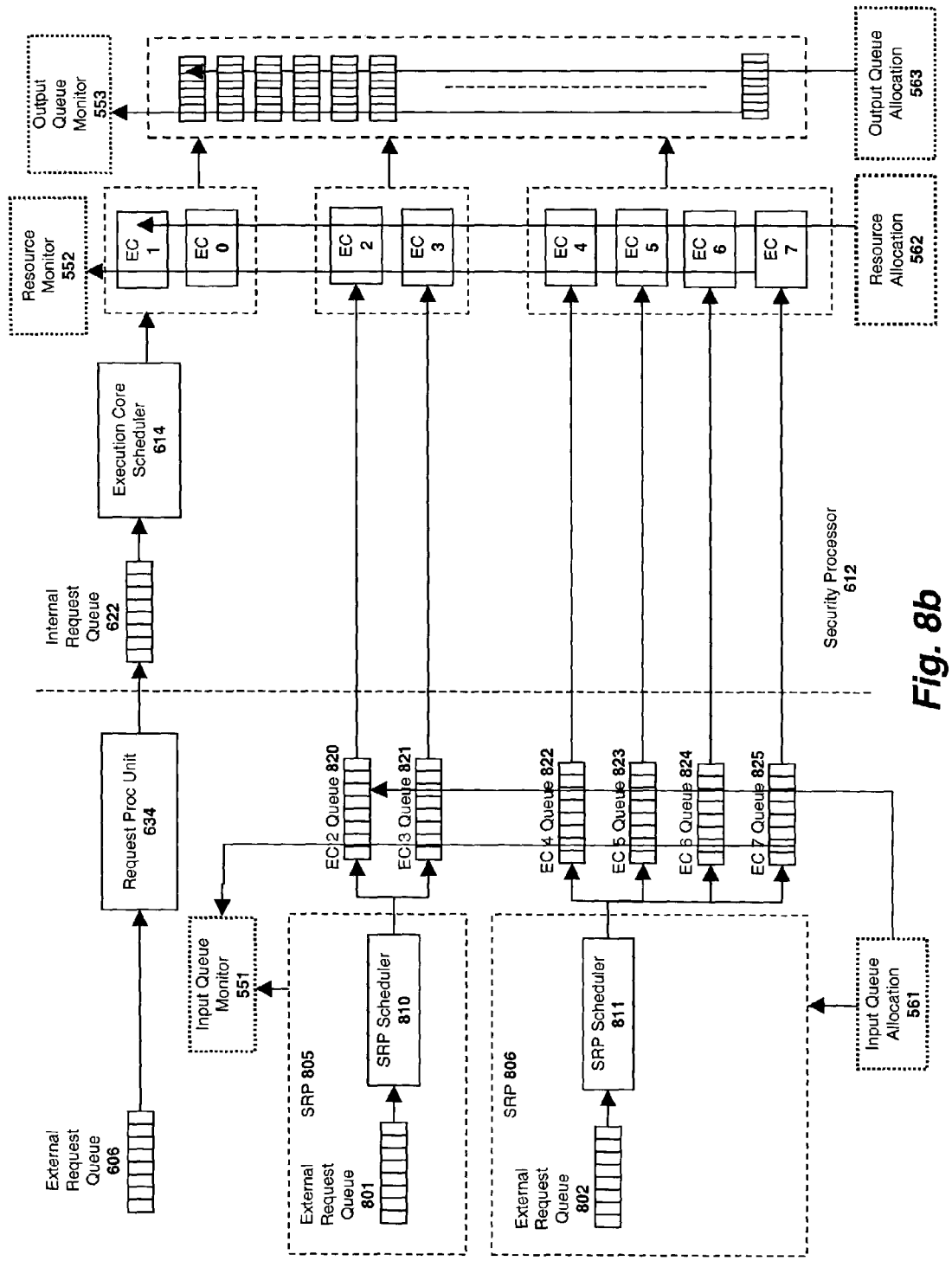
Figure 8C:
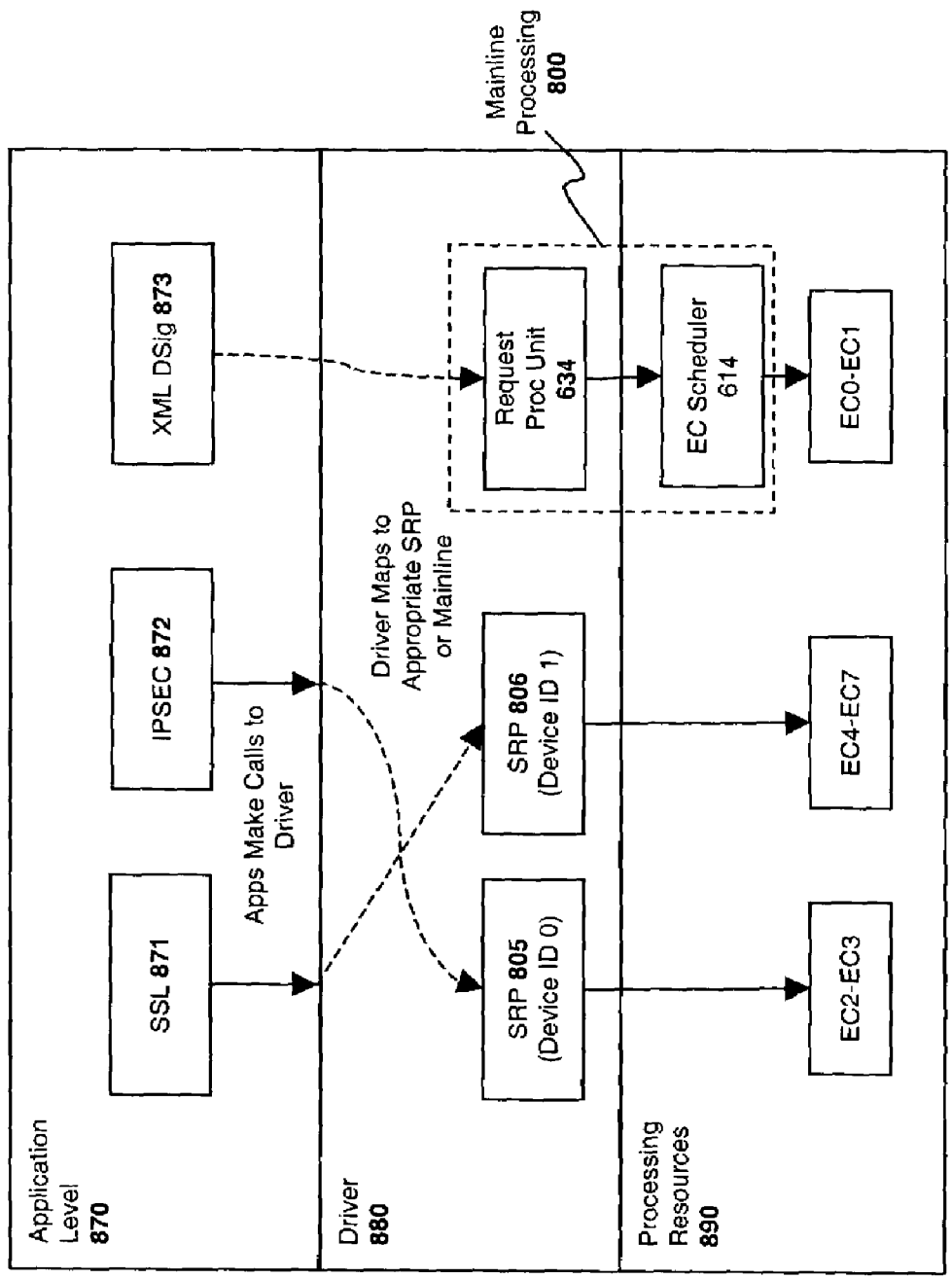
FIG. 8c illustrates one embodiment in which calls from an application layer are transmitted to an appropriate processing pipeline by a driver.

In one embodiment of the invention, illustrated in FIGS. 8a–c, a dynamic provisioning pipeline 801 is employed in parallel with the mainline processing pipeline 800 (described above with respect to FIGS. 6 and 7). As illustrated, the dynamic provisioning pipeline 801 includes one or more software request processors ("SRPs") 805–806. In one embodiment, the SRPs, 805 and 806, each include an SRP request queue 801 and 802, respectively, and an SRP scheduler 810 and 811, respectively. Each SRP scheduler 810 and 811 schedules data traffic to a plurality of execution core queues 820–821 and 822–825, respectively. As described in greater detail below (see "Dynamic Provisioning" section), once the initial association is established between SRPs, queues and execution cores, the SRPs and execution cores/queues may thereafter by dynamically reallocated based on relative changes in data traffic (i.e., relative changes in security protocol types and/or defined service levels).

Referring to FIG. 3c, in one embodiment, when the system is initialized, a driver 880 (e.g., executed by the host processor 602) assigns a particular device ID to each SRP and links each SRP to a particular set of execution cores. For example, SRP 805 is assigned device ID #0 and is associated with EC2–EC3; SRP 806 is assigned device ID #1 and is associated with EC4–EC7; and the remainder of the execution cores, EC0–EC1, are assigned to the mainline processing pipeline 800, including the request processing unit 634 and the execution core scheduler 614. In operation, the driver 880 maps calls from the application level 870 to the appropriate SRP, using the pre-configured device ID #'s, or to the mainline processing pipeline 800. The SRPs 805 and 806 and/or the mainline processing pipeline then service the calls (as described herein) by farming out processing requests to the execution cores EC0–EC7.

In one embodiment, each individual SRP 805–806 and the mainline processing pipeline 800 is configured to handle a particular type of data traffic (e.g., SSL, IPSEC, XML DSig, . . . etc). In the specific example illustrated in FIGS. 8a–c, SRP 806 is configured to handle SSL-based data traffic, SRP 805 is configured to handle IPSEC-based data traffic, and the mainline processing pipeline 800 is configured to handle XML DSig traffic. Of course, these particular allocations are used merely for the purpose of illustration. The underlying principles of the invention are not limited to any specific protocol/SRP allocation.

When the system is initialized (i.e., when the host processor 602 and security processor are initially powered), the driver 880 loads the appropriate microcode into each of the execution units. Returning to the above example, execution cores EC0–EC1 are loaded with mainline microcode, configured to process XML DSig traffic, using the mainline queuing mechanisms described above (see FIGS. 6–7 and associated text); EC2–EC3 are loaded with microcode to process IPSEC-based data traffic; and EC4–EC7 are loaded with microcode to process SSL-based data traffic.

Alternatively, in one embodiment, a single microcode image containing microcode for each of the supported security protocols is loaded within each of the execution cores. Thus, in this embodiment, when reallocation of an execution core is performed (as described herein with respect to various different embodiments) it is not necessary to load new microcode on the reallocated execution core. Rather, the microcode is already loaded and is therefore immediately accessible by the execution core.

As mentioned above, in operation, the driver 880 maps incoming security processing requests to an appropriate SRP or to the mainline processing pipeline 800 as the requests are received by the security processor 612. Referring to SRP 806, for example, request headers identifying the data are initially placed, in order, in an SRP request queue 802. The underlying input data 608A–608I identified by the request headers is maintained within the host memory, as described above. In one embodiment, the SRP request queue 802 is a circular queue maintained within the host memory 604. Multiple request header entries may be concurrently loaded in the SRP request queue 802 in a linked list format. That is, each request header entry contains a pointer to the next request header in sequence. The last request header contains a null pointer, indicating that it is the last entry in the list. It should be noted, however, that the underlying principles of the invention are not limited to any particular queuing mechanism.

In one embodiment, the SRP scheduler 811 continually checks the status of each of its execution core queues 822–825 in a round robin manner. When it identifies an available execution core queue (e.g., one which has been emptied by its corresponding execution core), it transfers the linked request header list to the execution core queue. For example, if execution core queue 823 is empty, then the SRP scheduler 811 transfers the linked request header list to that queue. Once the linked request header list is placed in the execution core queue 823, the execution core EC5 associated with that queue processes the data identified by each request header entry until the execution queue 823 is once again empty. The execution core EC5 reads the input data 608A–608I identified by the request headers from the host memory and stores the results back as output data 609A–609I. As illustrated, a set of output queues 860 may temporarily buffer the request headers and/or output data prior to transferring the output data to the host memory 604. In one embodiment, the execution core EC5 identifies the last request header entry in each linked list by its null pointer.

Dynamic Provisioning

As in the embodiment illustrated in FIG. 5, the embodiment illustrated in FIGS. 8a–c provides for dynamic provisioning of security processing resources. Accordingly, once the initial execution core and SRP allocations have been made, data traffic is continually monitored and analyzed to determine whether a more efficient allocation is possible, taking guaranteed bandwidth constraints into account. If a more efficient allocation is possible, then the processing resources are reallocated dynamically (i.e., in real-time, without powering down and reconfiguring the security processor 612).

FIG. 8*b* illustrates generally how various monitoring modules 551–553 and allocation modules 561–563 may be configured to detect and dynamically adjust to different traffic load conditions by reallocating SRPs, queues and/or execution cores as needed. In one embodiment, these modules 551–553 and 561–563 form part of the driver 880 illustrated in FIG. 8*c*.

Input queue usage may be continually tracked via an input queue monitor 551 and output queue usage may be continually tracked by an output queue monitor 553. As mentioned above, the amount of data stored within the queues may provide an indication of the relative amounts of data traffic associated with particular security protocols and/or service levels. For example, if a queue used to store IPSEC traffic has reached its threshold value, then this may indicate that the resources currently allocated to IPSEC traffic are not sufficient. In one embodiment, a resource monitor 552 is configured to directly monitor the usage at each of the execution cores to identify the relative load for each protocol and/or service.

Regardless of how the relative load associated with each protocol and/or service level is measured, in one embodiment, it is provided to the allocation modules 561–563 which use it to dynamically reallocate the execution cores EC1–EC7, SRPs 805–805, and/or the input and output queues, 801–802, 820–825, 860, associated with each protocol and/or service level. Returning to the above example, execution cores EC4–EC7 may initially be allocated to processing SSL traffic, execution cores EC2–EC3 may initially be allocated to processing IPSEC traffic, and execution cores EC0–EC1 may initially be allocated to processing XML DSig traffic. Over time, however, the execution cores EC4–EC7 allocated to SSL traffic may become overloaded (e.g., as measured by the input or output queue monitors, 551 or 553, respectively, or the resource monitor 552).

As such, in one embodiment, the allocation modules 561–563 may compare the load the execution cores EC4–EC7 dedicated to SSL with the load on the execution cores EC2–EC3 dedicated to IPSEC and the execution cores EC0–EC1 dedicated to XML DSig. Instead of a direct comparison, the allocation to module 560 may simply evaluate the load on the execution cores EC0–EC3 and the queues dedicated to IPSEC and XML DSig. If the load on EC0–EC1 or EC2–EC3 is below some specified threshold value, then the processing resource allocation module 562 will automatically reallocate one or more of the execution cores from EC0–EC1 or EC2–EC3 to the EC4–EC7 group, to process SSL traffic. In one embodiment, the specified "threshold" is a determination that, if the execution cores are reallocated from EC0–EC3, there will still be sufficient number of execution cores to handle the IPSEC and XML DSig data traffic.

In addition, the input queue allocation module 561 will reallocate the execution core queue(s) associated with the reallocated execution core. For example, if execution core EC0 is reallocated to process SSL traffic, then the queue allocation module 561 will add a new execution core queue to the execution core group 822–825 associated with SRP scheduler 811. The new execution core queue will then be used as the execution core queue for EC0 In one embodiment, in the process of reassigning EC0, the driver 880 will reload EC0 with the appropriate microcode (i.e., SSL-based microcode).

The output queue allocation module 563 may also reallocate one or more output queues 860 to processing SSL traffic. If an execution core queue is reallocated from one SRP to another, prior to reallocation, the input queue allocation module 561 will wait until any pending requests stored within the execution core queue have processed by the execution core.

In one embodiment, even if a potentially more "efficient" resource allocation is possible, guaranteed bandwidth constrains may limit the manner in which resources may be reallocated. For example, if a specified amount of processing and queuing/memory bandwidth is guaranteed for IPSEC data traffic, then an execution core and associated queues/memory will not be removed from the group dedicated to IPSEC data traffic if doing so would cause the available processing bandwidth to drop below the guaranteed threshold value, even if the execution cores and queues/memory dedicated to other types of data traffic are overloaded relative to the IPSEC execution cores.

Execution cores, SRPs and queues may be intelligently provisioned based on service level as well as protocol. For example, in one embodiment, the resource/queuing allocation parameters 565 may specify a guaranteed level of throughput for a particular, heightened service level, at the sacrifice of all subordinate service levels. Thus, in this embodiment, resources dedicated to the heightened service level may not be reallocated unless sufficient resources are available to guarantee the defined level of processing and/or queuing bandwidth.

In one embodiment, the SRPs 805–806, execution core queues 820–825, request processing unit 634 and external request queue 606 are implemented in software. For example, each of these modules and associated data may be generated and maintained by a software driver executed by the host processor 602 processor. However, the underlying principles of the invention are not limited to a software implementation. For example, any of the functional modules illustrated in FIGS. 8*a*–*c* may be embodied in hardware or firmware, while still complying with the underlying principles of the invention.

A Third Embodiment of the Invention

Another embodiment of the invention will now be described with respect to FIGS. 9–10. This embodiment includes an advanced flow-through security processing architecture capable of concurrently processing multiple security protocols and dynamically reallocating processing resources to different protocols and/or defined service levels in response to detected changes in data traffic.

Figure 9:
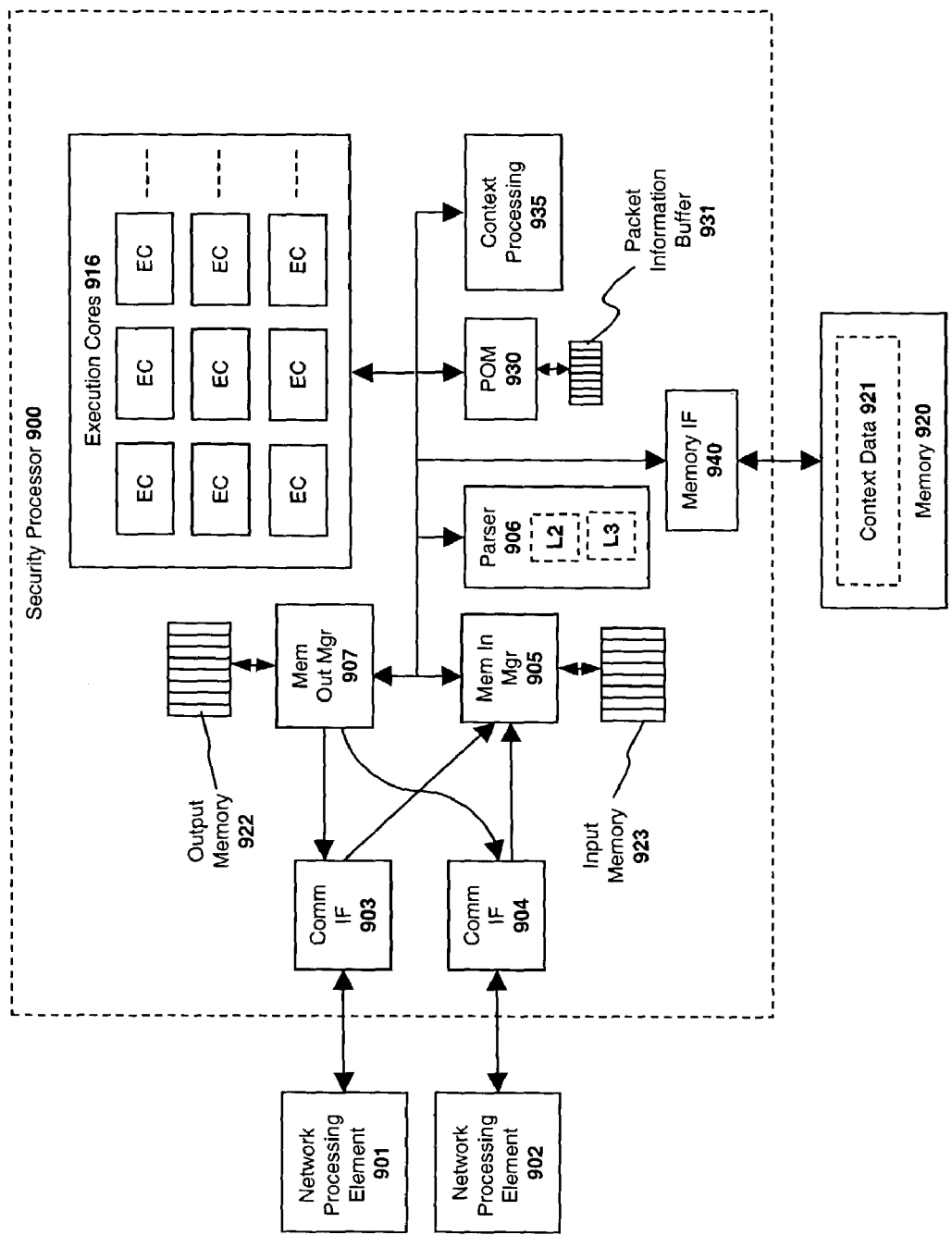
FIG. 9 illustrates an inline implementation of a security processor employed in one embodiment of the invention.

As in previous embodiments, the security processor 900 illustrated in FIG. 9 includes a plurality of programmable execution cores 916 capable of performing a variety of security processing operations (e.g., such as base cryptographic operations DES/3DES, AES, RC4, SHA-1, MD5, and modular exponentiation). As in previous embodiments, a different set of microcode is loaded into each execution core to provide the execution core with the ability to process a specific type of security protocol (e.g., IPSEC, SSL, Web DSig, . . . etc).

In FIG. 9, the security processor 900 is illustrated in an in-line configuration between two different network processing elements 901 and 902. As such, the security processor 916 includes two (or more) bi-directional communication interfaces 903 and 904, for enabling communication with external network processing elements 901, and 902, respectively. In one embodiment, the communication interfaces 903, 904 are System Packet Interface Level 3 ("SPI-3") interfaces and/or System Packet Level 4 ("SPI-4") interfaces, each comprising a plurality of input and output SPI-3/SPI-4 ports (e.g., 32 input ports and 32 output ports). However, the specific type of interface employed to communicate with the external network processing elements 901 and 902 is not pertinent to the underlying principles of the invention.

The security processor 900 is capable of processing a variety of different data packet formats generated by the network processing elements 901 and 902 and is capable of being used in a variety of configurations. By way of example, and not limitation, in one embodiment, network processing element 901 is a framer/MAC, coupling the security processor to a plurality of different physical I/O interfaces used for networking IP packets (e.g., coupled to the Internet), and network processing element 902 is a network processor (e.g., employed within a router or gateway). Alternatively, in one embodiment, network processing element 901 is a load balancer coupled between the security processor 900 and an array of Web servers (not shown) and network processing element 902 is a TCP terminator for processing TCP traffic to/from the Internet. In addition, the security processor 900 may be configured as a coprocessor to a single network element such as a single network processor. It should be noted, however, that the network processor may be employed in a variety of different configurations while still complying with the underlying principles of the invention.

Packets transmitted through an input port of either of the communication interfaces 903 or 904 are initially buffered within an input memory 923 managed by input memory manager 905. In one embodiment, packets are not processed until the complete packet has been received (and its CRC is checked, if necessary). Processed packets (or packets which are not meant to be processed) are buffered within an output memory 922 managed by an output memory manager 907, prior to being transmitted through an output port of one of the communication interfaces 903 or 904 (e.g., a SPI-4 output port).

In one embodiment, both the input memory 923 and the output memory 922 store packets as linked-lists of one or more 256-byte blocks. Although the blocks are shared between packets from all ports, in one embodiment, the memory input manager 905 and memory output manager 907 manage the allocation of the blocks on a per-port and/or a per-interface basis. For example, a per-port counter may be maintained for each buffer which indicates the number of blocks that are currently being used by a given port.

In addition, in one embodiment, a different maximum threshold may be programmed for each port (e.g., stored within a CSR register), indicating the number of blocks which that port is allowed to consume. The counter values may then be compared to the threshold values to determine whether a given port exceeds its threshold. The input memory manager 905 increments the corresponding input memory port count incrementally each time it allocates a block for an input packet on the corresponding port, and decrements the counts incrementally when the same blocks are free up. Similarly, in one embodiment, the output memory manager 907 maintains thresholds for each of the output ports. The output memory manager 907 increments the corresponding output port counter when an execution unit allocates a complete packet to the corresponding port, and decrements the counter incrementally as the blocks are freed up (e.g., as processed data packets are is transmitted out of the port). In one embodiment, the same thresholds may also be implemented on a per-interface basis.

As described below with respect to FIG. 10, one embodiment of the invention uses these thresholds to force backpressure. For the input memory 923, the backpressure applies to the input ports of the communication interfaces 903, 904. If the per-interface thresholds are exceeded in the input memory 923, the input ports of that interface are back-pressured. For the output memory 922, the backpressure applies to the execution unit scheduling and allocation (as described in detail below).

Once a complete packet is received within the input memory 923, a parser 906 parses each packet header to determine if the packet needs to be processed by the execution cores 916, or if it can simply be passed through the security processor 916 without processing (e.g., if the packet is unencrypted). As indicated in FIG. 9, in one embodiment, the parser 906 includes multiple layers of parsing logic which it uses to parse different types of packets. For example, the parser 906 includes Level 2 ("L2") logic (referring generally to data-link layer of the OSI model) which parses any L2 headers, if present. In addition, in one embodiment, the parser 906 includes L3 logic to parse layer 3 packets (e.g., referring generally to the network layer of the OSI model). For example, the L3 logic of the parser may parse each IP header to check for exception cases.

Regardless of the specific type of packet received by the parser 906 (e.g., a MAC frame or an IP packet), the parser 906 extracts any information needed by the security processor 900 to perform the correct security operations on the packet. For example, the parser 906 may extract cryptographic context information needed to process the packet. For IPSEC, cryptographic context information is required for each security association ("SA"). For SSL, cryptographic context information is required per each direction of an SSL session. As understood by those of skill in the art, the context information typically contains the secret keys needed for symmetric encryption and authentication. Once again, the particular type of context information extracted by the parser 906 and the particular type of security protocol employed is not relevant to the underlying principles of the invention.

In one embodiment, the parser 906 also extracts a group ID code from the packet header, identifying the packet's pre-assigned packet processing group. In one embodiment, the group ID code is assigned by one of the network processing elements 901–902. Alternatively, the group ID code may be assigned by the security processor 900 itself. As will be described in greater detail below with respect to FIG. 10, up to N group queues may be allocated for processing packets from N different groups. Packets may be grouped and processed in a variety of ways including, but not limited to, protocol type and/or quality of service ("QOS") type.

The parser 906 transmits the parsed packet information, including information identifying the position of the underlying data within the input memory 923 (e.g., an address pointer), to a packet order manager ("POM") 930 (e.g., in sequential packet completion order). The POM 930 temporarily buffers the packet information in a packet information buffer 931. In one embodiment, the packet information buffer 931 contains a per-packet in-flight table that can hold a plurality of packet entries (e.g., 2048) and a link memory to order the packets in the packet information buffer 931. As described below with respect to FIG. 10, the POM 930 maintains information about in-flight packets and schedules packets to the execution cores 916. Following packet processing, the POM 930 schedules packets to the output of the communication interface 903. If a packet does not require processing, the POM 930 forwards the packet directly from the input memory 923 to the relevant communication interface output (i.e., but only after packet ordering constraints are met).

If the packet requires processing, the POM 930 passes control information associated with the packet to a context processing unit 935 as it schedules the packet to an execution core 916. Using the control information, the context processing unit 935 retrieves the cryptographic context data 921 needed to process the packet, either from a local cache (not shown) or from an external memory 920 (e.g., a DDR SDRAM memory). The context processing unit 935 pushes the cryptographic context data 921 into the register file of one of the execution cores 916. The micro-coded execution core 916 then retrieves the packet data from the input memory 923 and performs the relevant security operations on the packet (e.g., IPSEC/SSL transformations).

For IPSEC operations, more interactions between the execution core and the context processing unit 935 may be required since parallel execution cores may need atomic access to the context data 921 to implement sequence numbers and window checks. In one embodiment, these atomic operations are performed locally, within the context processing unit 935. The execution core 916 then pushes the resultant packet into the output memory 922 (via the output memory manager 907). The parser 906 may also parse the packet's IP header to check for exception conditions.

The POM 930 is notified of the resultant packet when it is completely written into the output memory 922. The POM 930 then pulls the packet from the output memory 922 and forwards it through to the output of one of the communication interfaces 901, 902, once ordering constraints allow.

Resource Allocation

As mentioned briefly above, the POM 930 is responsible for maintaining packet synchronization for multiple data flows, each of which may require different types of security processing (e.g., IPSEC, SSL). In addition, in one embodiment, the POM is responsible for scheduling packets to the execution cores as specified by the set of resource/queuing allocation parameters 565. The POM 930 uses packet information extracted from packet headers by the parser 906 to make packet scheduling determinations.

Figure 10:
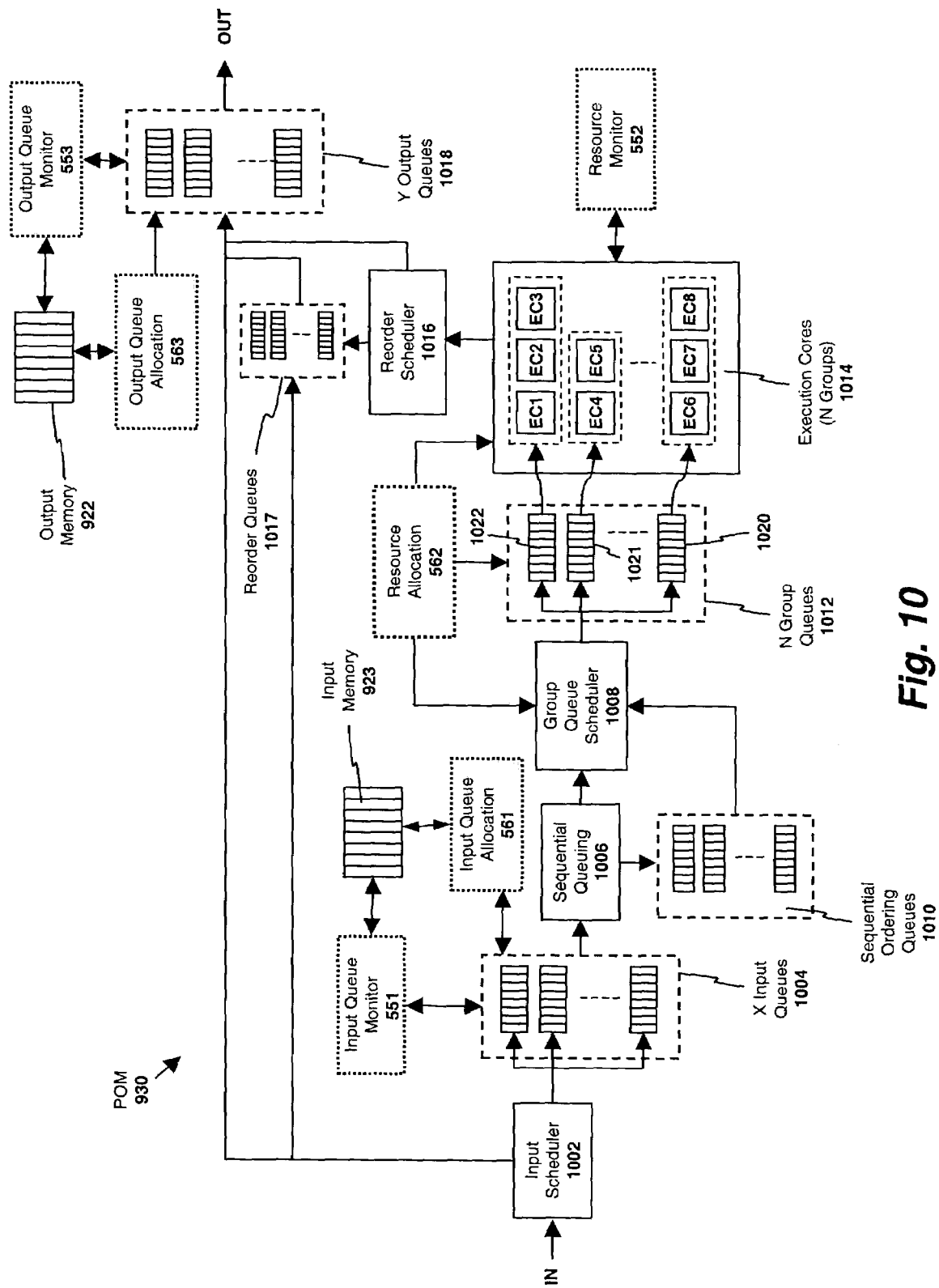
FIG. 10 illustrates one embodiment of an apparatus for intelligently allocating resources and input/output queues.

FIG. 10 illustrates the logical flow of packet information buffer 931 entries (hereinafter "packet entries") through the POM 930. The elements shown in FIG. 10 include a packet input scheduler 1002, X input queues 1004, a sequential ordering scheduler 1006 and associated ordering queues 1010, a group queue scheduler 1008 and N associated group queues 1012, a plurality of execution cores 1014, a reorder scheduler 1016 and associated reorder queues 1017, and a set of Y output queues 1018.

In operation, incoming packet entries, each representing data packets stored within the input memory 923, are forwarded to one of several destinations by an input scheduler 1002. Packet entries for packets which do not require processing may be forwarded directly to one of Y output queues 1018 or to a set of reorder queues 1017 (described below). Packet entries associated with packets that require processing are buffered within one of the X input queues 1004. In one embodiment, a separate input queue is associated with a particular output port and/or with a particular queue within the set of Y output queues 1018.

Sequential queuing logic 1006 determines whether the packet entries within the input queues 1004 require strict sequential ordering and, if so, transfers the packet entries to a set of sequential ordering queues 1010. Certain types of security processing protocols require precise sequential packet ordering. For example, SSL encryption and decryption of records using the same cryptographic context requires strict serialization. Thus, if the security processor 900 is configured to process both SSL and IPSEC data traffic, the sequential queuing logic 1006 forwards SSL packet entries to the sequential ordering queues 1010 and forwards IPSEC packets (which may not require strict serialization) directly through to the group queue scheduler 1008. In on embodiment, the sequential ordering logic 1006 includes a Tag content addressable memory (CAM) for associating each SSL session (or other security protocol-based data flow) with a particular queue within the sequential ordering queues 1010. However, the underlying principles of the invention are not limited to any particular serialization mechanism.

A group queue scheduler 1008 receives packet entries from the sequential ordering queues 1010 and/or directly from the sequential queuing logic 1006. In one embodiment, the group queue scheduler 1008 is the primary processing resource allocation mechanism for the security processor 900. The group scheduler 1008 places packet entries within one of N group queues 1012 based on the group ID code associated with the packet entry (e.g., extracted from the packet header by the parser 906). As mentioned above, the group ID code may be inserted in the packet header by one of the network processing elements 901–902.

Each group queue is serviced by a predefined group of execution cores 1014. For example, in FIG. 10, execution cores EC1–EC3 process packets identified by packet entries stored in group queue 1022; execution cores EC4–EC5 process packets identified by packet entries stored in group queue 1021; and execution cores EC6–EC8 process packets identified by packet entries stored in group queue 1020. In one embodiment, packet entries are removed from a group queue as the corresponding packets are provided to the execution cores servicing the group queue. As in previous embodiments, packets may be provided to the processing resources 1014 in a round robin manner.

The initial allocation of group queues 1012 and processing resources 1014 is provided by the processing resource allocation module 562 (as programmed by the resource/queuing allocation parameters 565). As in previous embodiments, resources may be allocated based on security protocol, thereby providing a guaranteed level of processing bandwidth for each supported protocol. For example, in FIG. 10, execution cores EC1–EC3 and associated group queue 1022 may initially be allocated to IPSEC traffic; execution cores EC4–EC5 and associated group queue 1021 may initially be allocated to XML DSig traffic; and execution cores EC6–EC8 and the associated group queue 1020 may initially be allocated to SSL data traffic, thereby guaranteeing a specified level of bandwidth for data traffic associated with each respective protocol.

In one embodiment, the execution cores EC1–EC3 allocated to IPSEC data traffic process IPSEC data packets as described in the co-pending application entitled IPSEC PERFORMANCE OPTIMIZATION, Filed Apr. 12, 2003, Ser. No. 10/411,967, which is assigned to the assignee of the present application. It should be noted, however, that the underlying principles of the invention are not limited to any particular IPSEC implementation.

In one embodiment, an input queue allocation module 561 allocates a specified percentage of the input memory 923 and/or specified input queues 1004 based on protocol type.

Similarly, an output queue allocation module 563 allocates a specified percentage of the output memory 922 and/or specified output queues 1018 based on protocol type. In one embodiment, the input memory 923 and output memory 922 are allocated by setting thresholds as described above (e.g., using threshold counters).

Returning to the previous example, 3/8 of the input memory and output memory, 923 and 922, respectively, may be initially reserved for IPSEC traffic; 2/8 for XML DSig traffic; and 3/8 for SSL traffic, thereby guaranteeing a specified amount of memory space for certain types of data traffic. The input queues 1004 and output queues 1018 of the POM 930 may be similarly reserved for packet entries (which identify the actual data packets within the input memory 923 and output memory 922).

As in previous embodiments, processing resources and queues may be allocated based on variables other than merely the security protocol type. In one embodiment, for example, the initial allocations are based on a specified service type (either in addition to, or in lieu of allocations based on security protocol type). For example, in one embodiment, different quality of service ("QOS") levels may be defined for different types of content. Voice data traffic, or other real-time data traffic, for example, may be assigned a relatively higher level of service than standard data traffic. In addition, as in previous embodiments, different service levels may be specified for different customers.

In operation, a different group queue may be allocated for each defined level of service. For example, group queue 1022 may be allocated to "high" priority IPSEC data traffic whereas group queue 1021 may be allocated to "low" priority IPSEC data traffic. Because group queue 1022 is defined as "high" priority, the processing resource allocation module 562 may initially allocate it relatively more processing resources 1014 and/or input/output memory space than group queue 1021. Of course, a virtually unlimited number of group queue resource and memory allocations are possible while still complying with the underlying principles of the invention.

Dynamic Provisioning

In one embodiment, once the initial resource and memory allocations are made (as described above), data traffic is continually monitored and analyzed to determine whether a more efficient allocation is possible, taking the defined guaranteed bandwidth constraints into account. If a more efficient allocation is possible, then the processing resources are reallocated dynamically (i.e., in real-time, without powering down and reconfiguring the security processor 900).

The output queue monitor 553 tracks the amount of data stored within the output memory 922 and/or the POM output queues 1018 for each defined group. If the amount of data exceeds its predefined threshold, then backpressure is applied to the group queue scheduler 1008 and/or the sequential queuing logic 1006, to ensure that no additional data packets associated with that group are provided to the set of execution units dedicated to that group. In one embodiment, the sequential ordering logic 1006 will not extract an entry from a given input queue 1004 when the threshold in the output memory 922 of its expected output port is exceeded, or the threshold in the output memory 922 of the interface of its expected output port is exceeded.

In addition to backpressure, in one embodiment, the POM 930 will attempt to anticipate output buffer consumption by maintaining "uncertainty counters," in addition to the known counter values above. When the group queue scheduler 1008 schedules an input packet to an execution unit, in one embodiment, it predicts the expected output memory block usage and knows the expected output port. For example, for encrypts and decrypts, the predicted output memory block usage is a small amount larger than the predicted input memory block usage. For other types of operations, (e.g., general purpose operations initiated by a control processor), the predicted output memory is provided via a field in the input packet request header. Because the predictions may be wrong, one embodiment of the security processor tracks and resolves these predictions in the uncertainty counters. In one embodiment, the security processor 900 increments the uncertainty counts when it removes an input packet from an input queue, and decrements them when the execution unit creates all output packets in response to the input packet.

Uncertainty counters and thresholds may be provided for each output port, for each output interface, and/or for the total uncertainty of the system. In one embodiment, the sequential queuing logic 1006 does not remove a packet from an input queue when either: the uncertainty threshold for the expected output port has been exceeded; the uncertainty threshold for the expected output interface has been exceeded; or the total uncertainty threshold has been exceeded.

Alternatively, or in addition to the application of backpressure, the input queue allocation module 561, output queue allocation module 563 and/or processing resource allocation module 562 may reallocate input/output memory space, input/output queues and processing resources to the group requiring backpressure. Returning to the above example, execution cores EC1–EC3 in FIG. 10 are initially allocated to processing IPSEC traffic, execution cores EC4–EC5 are initially allocated to processing XML DSig traffic; and execution cores EC6–EC8 are initially allocated to processing SSL traffic. Over time, the execution cores EC1–EC3 allocated to IPSEC traffic may become overloaded, as indicated by the backpressure condition detected by the input or output queue monitors, 551 or 553, respectively, or the resource monitor 552.

As such, in one embodiment, the output queue allocation module 563 compares the amount of IPSEC data buffered within the output memory 922 (and/or the number of packet entries within the output queues 1016) with the amount of XML DSig and SSL traffic buffered within the output memory 922. If the amount of XML DSig and SSL traffic is below a specified amount (e.g., less than 50% the defined threshold), then the processing resource allocation module 562 may automatically reallocate one or more of the execution cores from EC4–EC8 to the IPSEC group of EC1–EC3. The particular execution core may be selected based on the relative load between SML DSig traffic and SSL traffic, as measured by the output queue monitors, 551 or 553, respectively, or the resource monitor 552.

In one embodiment, execution cores may be shared across different groups. For example, a first group may be defined with execution cores EC1–EC4 and a second group may be defined with execution cores EC3–EC4. Accordingly, either the first group or the second group may use execution cores EC3–EC4 under certain conditions. Moreover, the first group may be designated as a "high" priority group with a guaranteed bandwidth equal to that provided by two of the four execution cores allocated to that group (e.g., EC1–EC2). In addition, because of its designation as a "high" priority group, the first group will have priority over the two execution cores, EC3–EC4, shared between the two groups. Thus, even if the bandwidth requirements rise above the "guaranteed" bandwidth level, the first group will be provided with access to EC3–EC4 cores, notwithstanding the load on the first group. In this embodiment, the shared execution cores EC3–EC4 are equipped with microcode to allow them to process data traffic from both groups.

In addition, the input and output queue allocation modules 561 and 563, respectively, may allocate additional memory within the input and output memories 923 and 922, respectively, from the XML DSig group and/or the SSL group to the IPSEC group. As in prior embodiments, the specified "threshold" may be a determination that, if the execution cores are reallocated from EC4–EC8, there will still be sufficient number of execution cores and memory to handle the XML DSig and SSL data traffic.

In one embodiment, execution cores may be shared across different groups. For example, a first group may be defined with execution cores EC1–EC4 and a second group may be defined with execution cores EC3–EC4. Accordingly, either the first group or the second group may use execution cores EC3–EC4 under certain conditions. Moreover, the first group may be designated as a "high" priority group with a guaranteed bandwidth equal to that provided by two of the four execution cores allocated to that group (e.g., EC1–EC2). In addition, because of its designation as a "high" priority group, the first group will have priority over the two execution cores, EC3–EC4, shared between the two groups. Thus, even if the bandwidth requirements rise above the "guaranteed" bandwidth level, the first group will be provided with access to EC3–EC4 cores, notwithstanding the load on the first group. In this embodiment, the shared execution cores EC3–EC4 are equipped with microcode to allow them to process data traffic from both groups.

In one embodiment, even if a potentially more "efficient" resource allocation is possible, guaranteed bandwidth constrains may limit the manner in which resources may be reallocated. For example, if a specified amount of processing and queuing/memory bandwidth is guaranteed for IPSEC data traffic, then an execution core and associated queues/memory will not be removed from the group dedicated to IPSEC data traffic if doing so would cause the available processing bandwidth to drop below the guaranteed threshold value, even if the execution cores and queues/memory dedicated to other types of data traffic are overloaded relative to the IPSEC execution cores.

In addition, as in prior embodiments, new microcode is loaded into the execution cores being reallocated. For example, if an execution core is reallocated from the SSL group EC6–EC8 to the IPSEC group EC1–EC3, then the SSL microcode is replaced by IPSEC microcode. Similarly, if an execution core is reallocated from the XML DSig group EC4–EC5 to the IPSEC group EC1–EC3, then the XML DSig microcode is replaced by IPSEC microcode.

Resources may be intelligently provisioned based on service level as well. For example, in one embodiment, the resource/queuing allocation parameters 565 may specify a guaranteed level of throughput for a particular, heightened service level, at the sacrifice of all subordinate service levels. Thus, in this embodiment, resources dedicated to the heightened service level may not be reallocated unless sufficient resources are available to guarantee the defined level or processing and/or queuing bandwidth.

After being processed by one of the execution cores, each packet entry is provided to a reorder queue 1017 under control of a reorder scheduler 1016. The reorder queues are configured to maintain a per-port order as the security processor processes each packet. In one embodiment, a separate reorder queue is allocated to each output port, and each packet entry enters the queue for its expected output port. As mentioned above, packet entries may enter a reorder queue 1017 at the time that they arrive at the POM 930. A packet entry may simultaneously be in the reorder queue 1017 and either an input queue 1004, a sequential ordering queue 1010, or a group queue 1020. Packet entries exit the reorder queue 1017 and enter an actual output queue 1018 when the execution core produces all relevant output packets. Packet entries exit each reorder queue 1017 in order, per the associated output port.

The output queues 1018 maintain the order of packets that have completed their execution unit processing requirements (or did not have any processing requirements) and have satisfied all other ordering requirements. A packet entry for an input packet that does not require any execution unit processing enters an output queue immediately upon arriving at the POM 930, if it does not enter the reorder queue. A packet entry for packet created by an execution unit enters an output queue 1018 immediately when created if the packet entry is not placed in a reorder queue. When a packet entry is in a reorder queue, it enters the output queue 1018 once reordering and processing requirements are satisfied. In one embodiment, a separate output queue 1018 is allocated for every output port, and once a packet entry enters an output queue, the security processor 900 sends the relevant packet out the selected port.

In one embodiment, the various "queues" illustrated in FIG. 10 are not discrete storage elements. Rather, they are defined, addressable memory blocks within a single, contiguous memory space (e.g., such as SDRAM, DDRAM or RDRAM).

It should be noted that the specific examples set forth above are for the purpose of illustration only and should not be read to limit the scope of the invention. A virtually unlimited number of resource allocations based on security protocol and/or service level may be defined while still complying with the underlying principles of the invention.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It is also important to note that the apparatus and method described herein may be implemented in environments other than a physical integrated circuit ("IC"). For example, the circuitry may be incorporated into a format or machine-readable medium for use within a software tool for designing a semiconductor IC. Examples of such formats and/or media include computer readable media having a VHSIC Hardware Description Language ("VHDL") description, a Register Transfer Level ("RTL") netlist, and/or a GDSII description with suitable information corresponding to the described apparatus and method.

What is claimed is:

1. A method comprising:
    allocating a first plurality of security processing resources within a cryptographic processor to a first type of data traffic associated with a first type of security protocol and a first service level defined by a first level of guaranteed processing bandwidth;
    allocating a second plurality of security processing resources within the cryptographic processor to a second type of data traffic associated with a second type of security protocol and a second service level defined by a second level of guaranteed processing bandwidth, wherein the second level of guaranteed processing bandwidth is different from the first level of guaranteed processing bandwidth, the first and second plurality of security processing resources comprise a plurality of cryptographic execution cores logically separated into first and second groups, respectively, and the first type of data traffic is data traffic requiring processing according to the first type of security protocol and wherein the second type of data traffic is data traffic requiring processing according to the second type of security protocol;
    monitoring load on the first plurality of security processing resources and the second plurality of security processing resources as the first and second types of data traffic are processed; and
    reallocating some of the first plurality of security processing resources from processing the first type of data traffic to processing the second type of data traffic if detected load on the second plurality of resources is above a specified threshold value, wherein said reallocating some of the first plurality of resources to the second plurality of resources comprises reallocating execution cores from the first group to the second group.

2. The method as in claim 1 wherein the first and second plurality of security processing resources comprises a plurality of queues logically separated into first and second groups, respectively.

3. The method as in claim 2 wherein reallocating some of the first plurality of resources to the second plurality of resources comprises:
    reallocating queues from the first group to the second group.

4. The method as in claim 1 wherein monitoring load on the first plurality of security processing resources and the second plurality of security processing resources comprises:
    measuring a relative amount of input or output memory space consumed by the first and second types of data traffic.

5. The method as in claim 1 wherein the first type of security protocol is the secure sockets layer ("SSL") protocol and the second type of security protocol is the IP security ("IPSEC") protocol.

6. A security processing apparatus comprising:
    a cryptographic processor having a first plurality of security processing resources initially allocated to process a first type of data traffic associated with a first service level and according to a first type of security protocol and a second plurality of security processing resources initially allocated to process a second type of data traffic associated with a second service level and according to a second type of security protocol, wherein the first and second service levels are defined by different levels of guaranteed processing bandwidth, wherein the first and second plurality of security processing resources comprise a plurality of cryptographic execution cores logically separated into first and second groups, respectively;
    a monitor module to monitor load on the first plurality of security processing resources and the second plurality of security processing resources as the first and second types of data traffic are processed; and
    a resource allocation module to reallocate some of the first plurality of security processing resources from the first type of data traffic to the second type of data traffic if detected load on the second plurality of security processing resources is above a specified threshold value, wherein the resource allocation module reallocates execution cores from the first group to the second group in response to the detected load.

7. The security processing apparatus as in claim 6 wherein the first and second plurality of security processing resources comprises a plurality of queues logically separated into first and second groups, respectively.

8. The security processing apparatus as in claim 7 wherein the resource allocation module comprises a queue allocation module to reallocate queues from the first group to the second group in response to the detected load.

9. The security processing apparatus as in claim 6 wherein the monitor module detects load on the first plurality of security processing resources and the second plurality of security processing resources by measuring a relative amount of input or output memory space consumed by the first and second types of data traffic.

10. The security processing apparatus as in claim 6 wherein the first type of security protocol is the secure sockets layer ("SSL") protocol and the second type of security protocol is the IP security ("IPSEC") protocol.

11. A machine-readable medium having code stored thereon which defines an integrated circuit (IC), said IC comprising:
    a cryptographic processor having a first plurality of security processing resources initially allocated to process a first type of data traffic associated with a first service level and a second plurality of security processing resources initially allocated to process a second type of data traffic associated with a second service level, wherein the first and second service levels are defined by different levels of guaranteed processing bandwidth, wherein the first and second plurality of security processing resources comprises a plurality of cryptographic execution cores logically separated into first and second groups, respectively, and wherein the first type of data traffic is data traffic requiring processing according to a first type of security protocol and wherein the second type of data traffic is data traffic requiring processing according to a second type of security protocol;
    a monitor module to monitor load on the first plurality of security processing resources and the second plurality of security processing resources as the first and second types of data traffic are processed; and
    a resource allocation module to reallocate some of the first plurality of security processing resources from the first type of data traffic to the second type of data traffic if detected load on the second plurality of security processing resources is above a specified threshold value, wherein the resource allocation module reallocates execution cores from the first group to the second group in response to the detected load.

12. The machine-readable medium as in claim 11 wherein the first and second plurality of security processing resources comprises a plurality of queues logically separated into first and second groups, respectively.

13. The machine-readable medium as in claim 12 wherein the resource allocation module comprises a queue allocation module to reallocate queues from the first group to the second group in response to the detected load.

14. The machine-readable medium as in claim 11 wherein the monitor module detects load on the first plurality of security processing resources and the second plurality of security processing resources by measuring a relative amount of input or output memory space consumed by the first and second types of data traffic.

15. The machine-readable medium as in claim 11 wherein the first type of security protocol is the secure sockets layer ("SSL") protocol and the second type of security protocol is the IP security ("IPSEC") protocol.

* * * * *

UNITED STATES PATENT AND TRADEMARK OFFICE
CERTIFICATE OF CORRECTION

| | | |
|---|---|---|
| PATENT NO. | : 7,337,314 B2 | Page 1 of 1 |
| APPLICATION NO. | : 10/411945 | |
| DATED | : February 26, 2008 | |
| INVENTOR(S) | : Muhammad Raghib Hussain et al. | |

It is certified that error appears in the above-identified patent and that said Letters Patent is hereby corrected as shown below:

In the Specification

Column 5, Line 51, delete "DDRAMor" and insert -- DDRAM or --;

Column 7, Line 3, delete "module 540" and insert -- module 562 --;

Column 11, Line 14, delete "result pointer 612" and insert -- result pointer 712 --;

Column 13, Line 45, delete "allocation to module" and insert -- allocation module --;

Column 17, Lines 32-33, delete "communication interfaces 901, 902," and insert -- communication interfaces 903, 904, --;

Column 18, Line 12, delete "In on" and insert -- In one --;

Column 20, Line 43, delete "queues 1016)" and insert -- queues 1018) --;

Column 20, Line 52, delete "output queue" and insert -- input or output queue --; and Column 22, Line 29, delete "DDRAMor" and insert -- DDRAM or --.

Signed and Sealed this
Twenty-fourth Day of November, 2015

Michelle K. Lee
*Director of the United States Patent and Trademark Office*